US012775969B2

(12) United States Patent
Ramesh et al.

(10) Patent No.: US 12,775,969 B2
(45) Date of Patent: Oct. 27, 2026

(54) METHOD, APPARATUS, AND NON-TRANSITORY COMPUTER-READABLE MEDIUM FOR GUIDED CAPTURE METHODOLOGIES

(71) Applicant: eBay Inc., San Jose, CA (US)

(72) Inventors: Aditya Ramesh, Sunnyvale, CA (US); Ali Shahrokni, San Jose, CA (US); James Dylan Hines, Newberg, OR (US); Marco Piccirilli, Campbell, CA (US); Qiaosong Wang, San Francisco, CA (US); Antonio Haro, Walnut Creek, CA (US)

(73) Assignee: eBay Inc., San Jose, CA (US)

( * ) Notice: Subject to any disclaimer, the term of this patent is extended or adjusted under 35 U.S.C. 154(b) by 530 days.

(21) Appl. No.: 17/985,648

(22) Filed: Nov. 11, 2022

(65) Prior Publication Data

US 2024/0161162 A1 May 16, 2024

(51) Int. Cl.
*G06Q 30/00* (2023.01)
*G06Q 30/0601* (2023.01)

(52) U.S. Cl.
CPC ..... *G06Q 30/0623* (2013.01); *G06Q 30/0603* (2013.01); *G06Q 30/0643* (2013.01)

(58) Field of Classification Search
CPC ........................................ G06Q 30/0601–0645
See application file for complete search history.

(56) References Cited

U.S. PATENT DOCUMENTS 8,112,325 B2 2/2012 Foy et al.
8,611,659 B2 * 12/2013 Williams ............... H04N 23/62 382/173

(Continued)

FOREIGN PATENT DOCUMENTS

KR 20150070281 A 6/2015
WO 2017095834 A1 6/2017

OTHER PUBLICATIONS

S.K. Zhang, et al. “SceneViewer: Automating Residential Photography in Virtual Environments,” in IEEE Transactions on Visualization and Computer Graphics, vol. 29, No. 12, pp. 5523-5537, Dec. 2023, doi: 10.1109/TVCG.2022.3214836. (Year: 2022).*
Vidanapathirana, Madhawa, Lakmal Meegahapola, and Indika Perera. “Cognitive analysis of 360 degree surround photos.” arXiv preprint arXiv: 1901.05634 (2019). (Year: 2019).*
Paul, Sibendu, et al. “Enhancing Video Analytics Accuracy via Real-time Automated Camera Parameter Tuning.” arXiv e-prints (2021): arXiv-2107. (Year: 2021).*

(Continued)

*Primary Examiner* — Jeffrey A. Smith
*Assistant Examiner* — Kennedy Gibson-Wynn
(74) *Attorney, Agent, or Firm* — FIG. 1 Patents

(57) ABSTRACT

A system may receive, from a client device, a user input indicating a product that is to be listed for sale via an online marketplace, and may transmit an instruction for the client device to capture a video of the product from a set of multiple perspectives including a reference perspective. The system may receive the video of the product, where the video includes a set of multiple image frames depicting the product from the set of multiple of perspectives. The system may extract a subset of image frames of the set of multiple of image frames that depict the product from one or more cardinal views, where the one or more cardinal views are determined relative to the reference perspective. The system may then generate an item listing for listing the product for sale via the online marketplace, where the item listing includes the subset of image frames.

20 Claims, 11 Drawing Sheets

(56) References Cited

U.S. PATENT DOCUMENTS

| | | | | |
|---|---|---|---|---|
| 9,094,670 | B1 | 7/2015 | Furio et al. | |
| 10,652,455 | B2 | 5/2020 | Tobin | |
| 10,977,520 | B2 | 4/2021 | Turkelson et al. | |
| 2014/0104379 | A1 | 4/2014 | Glasgow | |
| 2016/0217328 | A1 | 7/2016 | Yanai | |
| 2018/0338126 | A1* | 11/2018 | Trevor | H04N 23/698 |
| 2020/0372570 | A1 | 11/2020 | Macfarland | |
| 2020/0374440 | A1 | 11/2020 | Glasgow | |
| 2021/0065269 | A1* | 3/2021 | Kumazawa | G06V 10/245 |
| 2021/0118096 | A1 | 4/2021 | Gonzales, Jr. | |
| 2021/0344891 | A1 | 11/2021 | Holzer et al. | |
| 2021/0366075 | A1 | 11/2021 | Chtcherbatchenko et al. | |
| 2022/0070388 | A1 | 3/2022 | Nihas et al. | |
| 2022/0124294 | A1 | 4/2022 | Verma | |
| 2022/0180551 | A1* | 6/2022 | Lui | G06Q 30/0643 |

OTHER PUBLICATIONS

Yueh-Ling Lin and M. -J. J. Wang, "Automatic feature extraction from front and side images," 2008 IEEE International Conference on Industrial Engineering and Engineering Management, Singapore, 2008, pp. 1949-1953, doi: 10.1109/IEEM.2008.4738212. (Year: 2008).*

23208758.5 , "Extended European Search Report", EP Application No. 23208758.5, Dec. 18, 2023, 10 pages.

Tan et al., An Augmented Reality Guided Capture Platform for Structured and Consistent Product Reference Imagery, MobileHCI '21 Adjunct, Sep. 27-Oct. 1, 2021, Toulouse & Virtual, France, 6 pages.

"Foreign Office Action", KR Application No. 2023-0155486, Sep. 11, 2025, 14 pages.

* cited by examiner

METHOD, APPARATUS, AND NON-TRANSITORY COMPUTER-READABLE MEDIUM FOR GUIDED CAPTURE METHODOLOGIES

FIELD OF TECHNOLOGY

The present disclosure relates generally to database systems and data processing, and more specifically to guided capture methodologies.

BACKGROUND

In order to list products for sale on an online marketplace, sellers may be expected to upload information associated with the product, such as a title, a description, and images of the product. Some online marketplaces offer tools or guides that prompt a seller for images of products from certain perspectives to provide a comprehensive representation of the product for the listing. However, some sellers may not upload images from all the requested perspectives (such as if the back side of the product exhibits a defect), and the system may be unable to determine if uploaded images are actually taken from the requested perspectives.

SUMMARY

A method is described. The method may include receiving, from a client device, a user input indicating a product that is to be listed for sale via an online marketplace, transmitting, to the client device based on the user input, an instruction for the client device to capture a video of the product from a set of multiple perspectives that includes a reference perspective, receiving the video of the product from the client device based on the instruction, the video including a set of multiple image frames depicting the product from the set of multiple perspectives, extracting a subset of image frames of the set of multiple image frames that depict the product from a set of multiple cardinal views, the set of multiple cardinal views determined relative to the reference perspective, and generating an item listing for listing the product for sale via the online marketplace, where the item listing includes the subset of image frames.

An apparatus is described. The apparatus may include a processor, memory coupled with the processor, and instructions stored in the memory. The instructions may be executable by the processor to cause the apparatus to receive, from a client device, a user input indicating a product that is to be listed for sale via an online marketplace, transmit, to the client device based on the user input, an instruction for the client device to capture a video of the product from a set of multiple perspectives that includes a reference perspective, receive the video of the product from the client device based on the instruction, the video including a set of multiple image frames depicting the product from the set of multiple perspectives, extract a subset of image frames of the set of multiple image frames that depict the product from a set of multiple cardinal views, the set of multiple cardinal views determined relative to the reference perspective, and generate an item listing for listing the product for sale via the online marketplace, where the item listing includes the subset of image frames.

Another apparatus is described. The apparatus may include means for receiving, from a client device, a user input indicating a product that is to be listed for sale via an online marketplace, means for transmitting, to the client device based on the user input, an instruction for the client device to capture a video of the product from a set of multiple perspectives that includes a reference perspective, means for receiving the video of the product from the client device based on the instruction, the video including a set of multiple image frames depicting the product from the set of multiple perspectives, means for extracting a subset of image frames of the set of multiple image frames that depict the product from a set of multiple cardinal views, the set of multiple cardinal views determined relative to the reference perspective, and means for generating an item listing for listing the product for sale via the online marketplace, where the item listing includes the subset of image frames.

A non-transitory computer-readable medium storing code is described. The code may include instructions executable by a processor to receive, from a client device, a user input indicating a product that is to be listed for sale via an online marketplace, transmit, to the client device based on the user input, an instruction for the client device to capture a video of the product from a set of multiple perspectives that includes a reference perspective, receive the video of the product from the client device based on the instruction, the video including a set of multiple image frames depicting the product from the set of multiple perspectives, extract a subset of image frames of the set of multiple image frames that depict the product from a set of multiple cardinal views, the set of multiple cardinal views determined relative to the reference perspective, and generate an item listing for listing the product for sale via the online marketplace, where the item listing includes the subset of image frames.

Some examples of the method, apparatuses, and non-transitory computer-readable medium described herein may further include operations, features, means, or instructions for determining a first set of angular offsets between the reference perspective and the set of multiple cardinal views, determining a second set of angular offsets between the reference perspective and the set of multiple perspectives associated with the set of multiple image frames, and determining that the subset of image frames depict the product from the set of multiple cardinal views based on a comparison between the first set of angular offsets and the second set of angular offsets.

In some examples of the method, apparatuses, and non-transitory computer-readable medium described herein, determining the reference perspective may include operations, features, means, or instructions for transmitting, via the instruction, for the client device to start the video from the reference perspective, where the reference perspective includes an image frame from a first set of image frames of the video and selecting a reference image frame from the set of multiple image frames, where the reference perspective may be associated with the reference image frame.

Some examples of the method, apparatuses, and non-transitory computer-readable medium described herein may further include operations, features, means, or instructions for calculating a set of multiple perspective vectors associated with the set of multiple image frames, where each perspective vector includes a vector between the product depicted in the respective image frame and the client device at a time when the respective image frame was captured and determining whether each image frame of the set of multiple image frames depicts the product from a cardinal view of the set of multiple cardinal views based on the respective perspective vector corresponding to the respective image frame, where extracting the subset of image frames may be based on the determination.

In some examples of the method, apparatuses, and non-transitory computer-readable medium described herein, the set of multiple perspective vectors may be calculated based on spatial location data received from the client device, a simultaneous localization and mapping operation performed on the set of multiple image frames, or both.

Some examples of the method, apparatuses, and non-transitory computer-readable medium described herein may further include operations, features, means, or instructions for receiving, via the user input, a product type associated with the product, a category associated with the product, or both and determining the set of multiple cardinal views associated with the product based on the product type, the category, or both, where extracting the subset of image frames may be based on determining the set of multiple cardinal views.

Some examples of the method, apparatuses, and non-transitory computer-readable medium described herein may further include operations, features, means, or instructions for extracting the subset of image frames of the set of multiple image frames based on the subset of image frames satisfying one or more image quality criterion, where the one or more image quality criterion include a lighting criteria, a focus criteria, a product, an object position criteria, or any combination thereof.

In some examples of the method, apparatuses, and non-transitory computer-readable medium described herein, the instruction includes directions for a user to capture the video while moving around the product, while rotating the product, or both.

In some examples of the method, apparatuses, and non-transitory computer-readable medium described herein, each cardinal view of the set of multiple cardinal views includes a range of viewing angles depicting the product and the subset of image frames may be extracted based on the subset of image frames depicting the product from a viewing angle within the range of viewing angles associated with at least one cardinal view of the set of multiple cardinal views.

A method is described. The method may include receiving, from a client device, a user input indicating a product that is to be listed for sale via an online marketplace, transmitting, to the client device based on the user input, an instruction for the client device to capture a video of the product from a set of multiple perspectives that includes a reference perspective, receiving the video of the product from the client device based on the instruction, the video including a set of multiple image frames depicting the product from the set of multiple perspectives, extracting a subset of image frames of the set of multiple image frames that depict the product from a set of multiple cardinal views, the set of multiple cardinal views determined relative to the reference perspective, and generating an item listing for listing the product for sale via the online marketplace, where the item listing includes the subset of image frames.

An apparatus is described. The apparatus may include a processor, memory coupled with the processor, and instructions stored in the memory. The instructions may be executable by the processor to cause the apparatus to receive, from a client device, a user input indicating a product that is to be listed for sale via an online marketplace, transmit, to the client device based on the user input, an instruction for the client device to capture a video of the product from a set of multiple perspectives that includes a reference perspective, receive the video of the product from the client device based on the instruction, the video including a set of multiple image frames depicting the product from the set of multiple perspectives, extract a subset of image frames of the set of multiple image frames that depict the product from a set of multiple cardinal views, the set of multiple cardinal views determined relative to the reference perspective, and generate an item listing for listing the product for sale via the online marketplace, where the item listing includes the subset of image frames.

Another apparatus is described. The apparatus may include means for receiving, from a client device, a user input indicating a product that is to be listed for sale via an online marketplace, means for transmitting, to the client device based on the user input, an instruction for the client device to capture a video of the product from a set of multiple perspectives that includes a reference perspective, means for receiving the video of the product from the client device based on the instruction, the video including a set of multiple image frames depicting the product from the set of multiple perspectives, means for extracting a subset of image frames of the set of multiple image frames that depict the product from a set of multiple cardinal views, the set of multiple cardinal views determined relative to the reference perspective, and means for generating an item listing for listing the product for sale via the online marketplace, where the item listing includes the subset of image frames.

A non-transitory computer-readable medium storing code is described. The code may include instructions executable by a processor to receive, from a client device, a user input indicating a product that is to be listed for sale via an online marketplace, transmit, to the client device based on the user input, an instruction for the client device to capture a video of the product from a set of multiple perspectives that includes a reference perspective, receive the video of the product from the client device based on the instruction, the video including a set of multiple image frames depicting the product from the set of multiple perspectives, extract a subset of image frames of the set of multiple image frames that depict the product from a set of multiple cardinal views, the set of multiple cardinal views determined relative to the reference perspective, and generate an item listing for listing the product for sale via the online marketplace, where the item listing includes the subset of image frames.

Some examples of the method, apparatuses, and non-transitory computer-readable medium described herein may further include operations, features, means, or instructions for determining a first set of angular offsets between the reference perspective and the set of multiple cardinal views, determine a second set of angular offsets between the reference perspective and the set of multiple perspectives associated with the set of multiple image frames, and determine that the subset of image frames depict the product from the set of multiple cardinal views based on a comparison between the first set of angular offsets and the second set of angular offsets.

DETAILED DESCRIPTION

Figure 1:
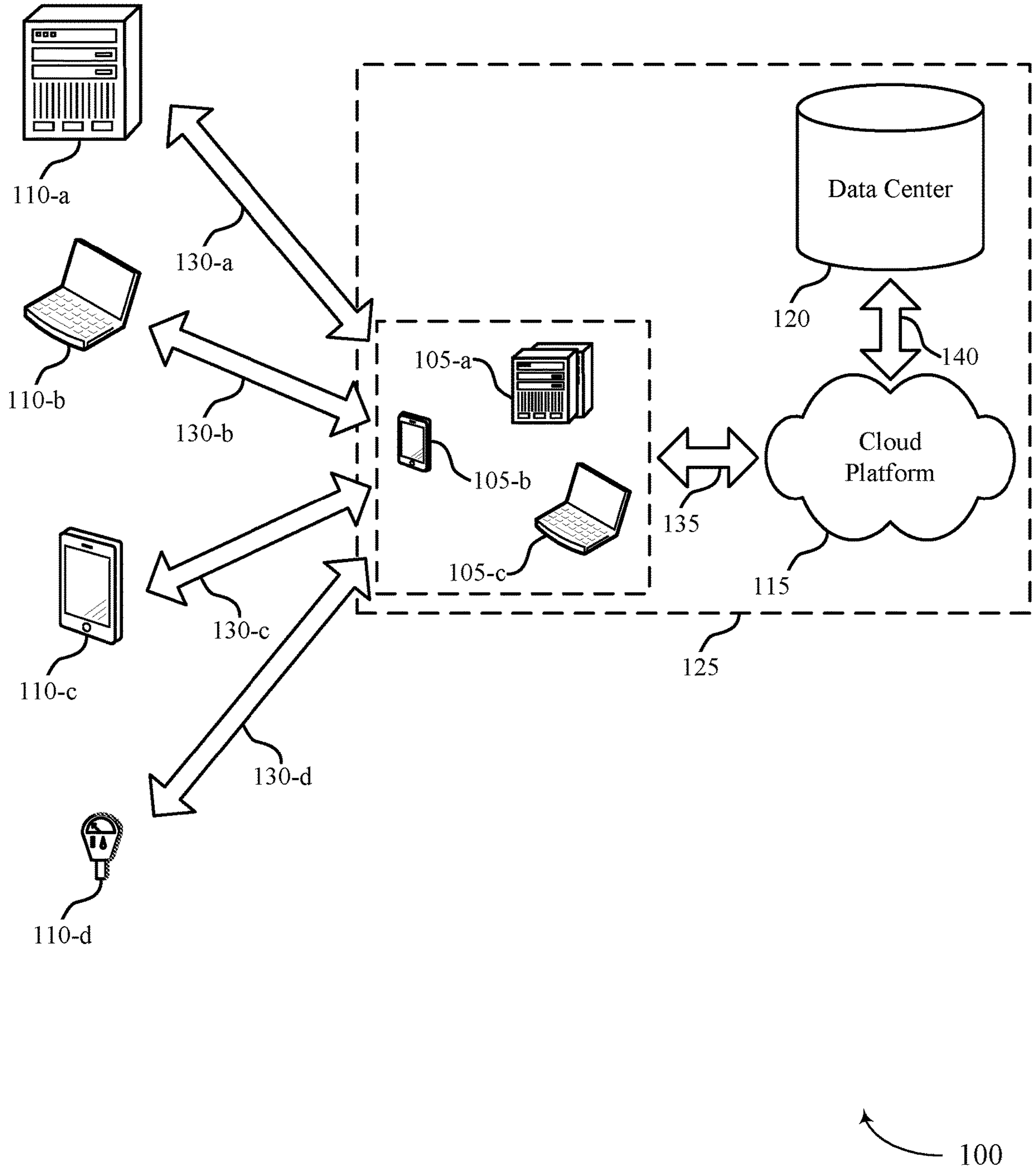
FIG. 1 illustrates an example of a computer-implemented system that supports guided capture methodologies in accordance with aspects of the present disclosure.

In order to list products for sale on an online marketplace, sellers may be expected to upload information associated with the product, such as a title, a description, and images of the product. The information provided by the seller may be useful for potential buyers when making purchasing decisions. In particular, the quality of images for a particular product has been found to have a significant impact as to whether potential buyers will view the listing for the product, and eventually purchase the product. As such, it is important for sellers to upload high quality images that accurately depict or represent the product. Some online marketplaces offer tools or guides that prompt a seller for images of products from certain perspectives to provide a comprehensive representation of the product for the listing. For example, some online marketplaces may prompt the seller to include images of a product from the front, the back, the top, and both sides. However, some sellers may not upload images from all the requested perspectives (such as if the back side of the product exhibits a defect), and the system may be unable to determine if uploaded images are actually taken from the requested perspectives. Moreover, such techniques may require users to take multiple images, save the images, and upload the respective images in order, which may be clunky and time consuming.

Accordingly, aspects of the present disclosure are directed to techniques for guided image capture used to retrieve product images that may be used to automatically generate a product listing. In particular, the techniques described herein may be implemented by an online marketplace to enable sellers to quickly and efficiently upload images of products that are to be listed for sale on the online marketplace.

For example, a system for an online marketplace accessible by a client device (e.g., smartphone) may instruct a seller to use a camera/video application to take a video of a product that is to be listed for sale as the user walks around the product, or rotates the product in front of the client device. As the client device takes the video of the product from different angles/perspectives, the system may automatically identify and retrieve image fames of the video that correspond to different "cardinal views" of the product, where the cardinal views and individual image frames of the video are evaluated relative to a "reference perspective" of the product. Subsequently, the system may extract image frames that depict the product from the respective cardinal views, where the extracted image frames may be included in a product listing for the product on the online marketplace. For instance, as a user takes a video of a car while walking around the car, the system may automatically identify and retrieve image frames that correspond to "cardinal views" of the car, such as image frames taken from the front of the car, the rear, and both sides. In this example, the retrieved images from the "cardinal views" may automatically be populated into a product listing for the car.

Aspects of the disclosure are initially described in the context of an environment supporting an on-demand database service. Additional aspects of the disclosure are described in the context of example guided capture systems, an example flowchart, and an example process flow. Aspects of the disclosure are further illustrated by and described with reference to apparatus diagrams, system diagrams, and flowcharts that relate to guided capture methodologies.

FIG. 1 illustrates an example of a system 100 for cloud computing that supports guided capture methodologies in accordance with various aspects of the present disclosure. The system 100 includes cloud clients 105, contacts (e.g., client devices 110), cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user/client device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple client devices 110. The interactions 130 may include communications, opportunities, purchases, sales, or any other interaction between a cloud client 105 and a client device 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Client devices 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A client device 110 may also be referred to as a customer, a potential customer, a lead, a client, or some other suitable terminology. In some cases, the client device 110 may be an example of a user device, such as a server (e.g., client device 110-*a*), a laptop (e.g., client device 110-*b*), a smartphone (e.g., client device 110-*c*), or a sensor (e.g., client device 110-*d*). In other cases, the client device 110 may be another computing system. In some cases, the client device 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a client device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a client device 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

As described previously herein, sellers may be expected to upload information associated with products that are to be listed for sale, such as a title, a description, and images of the product. The information provided by the seller may be useful for potential buyers when making purchasing decisions. In particular, the quality of images for a particular product has been found to have a significant impact as to whether potential buyers will view the listing for the product, and eventually purchase the product. As such, it is important for sellers to upload high quality images that accurately depict or represent the product. Some online marketplaces offer tools or guides that prompt a seller for images of products from certain perspectives to provide a comprehensive representation of the product for the listing. For example, some online marketplaces may prompt the seller to include images of a product from the front, the back, the top, and both sides. However, some sellers may not upload images from all the requested perspectives (such as if the back side of the product exhibits a defect), and the system may be unable to determine if uploaded images are actually taken from the requested perspectives. Moreover, such techniques may require users to take multiple images, save the images, and upload the respective images in order, which may be clunky and time consuming.

Accordingly, the system 100 shown and described in FIG. 1 may support techniques for guided image capture used to retrieve product images that may be used to automatically generate a product listing. In particular, the system 100 may support techniques for operating an online marketplace which enables sellers to quickly and efficiently upload images of products that are to be listed for sale on the online marketplace.

For example, the subsystem 125 associated with an online marketplace accessible by a client device 110 (e.g., smartphone) may instruct a seller associated with the client device 110 to use a camera/video application to take a video of a product that is to be listed for sale as the user walks around the product, or rotates the product in front of the client device. As the client device takes the video of the product (using client device 110) from different angles/perspectives, the subsystem 125 (e.g., cloud platform 115) may automatically identify and retrieve image fames of the video that correspond to different "cardinal views" of the product, where the cardinal views and individual image frames of the video are evaluated relative to a "reference perspective" of the product. Subsequently, the subsystem 125 may extract image frames that depict the product from the respective cardinal views, where the extracted image frames may be included in a product listing for the product on the online marketplace. For instance, as a user takes a video of a car while walking around the car, the system may automatically identify and retrieve image frames that correspond to "cardinal views" of the car, such as image frames taken from the front of the car, the rear, and both sides. In this example, the retrieved images from the "cardinal views" may automatically be populated into a product listing for the car.

Techniques described herein may improve the speed and efficiency with which users are able to generate item listings for products that are to be listed for sale via an online marketplace. Additionally, by evaluating whether image frames depict a product from cardinal views, techniques described herein may be used to ensure that item listings include images that accurately represent and depict the product from all pertinent viewpoints. As such, techniques described herein may improve a quality of item listings, and may facilitate improved trust between buyers and sellers by reducing a probability that sellers purposefully omit important images of the product, such as images showing key features, angles, and potential defects.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
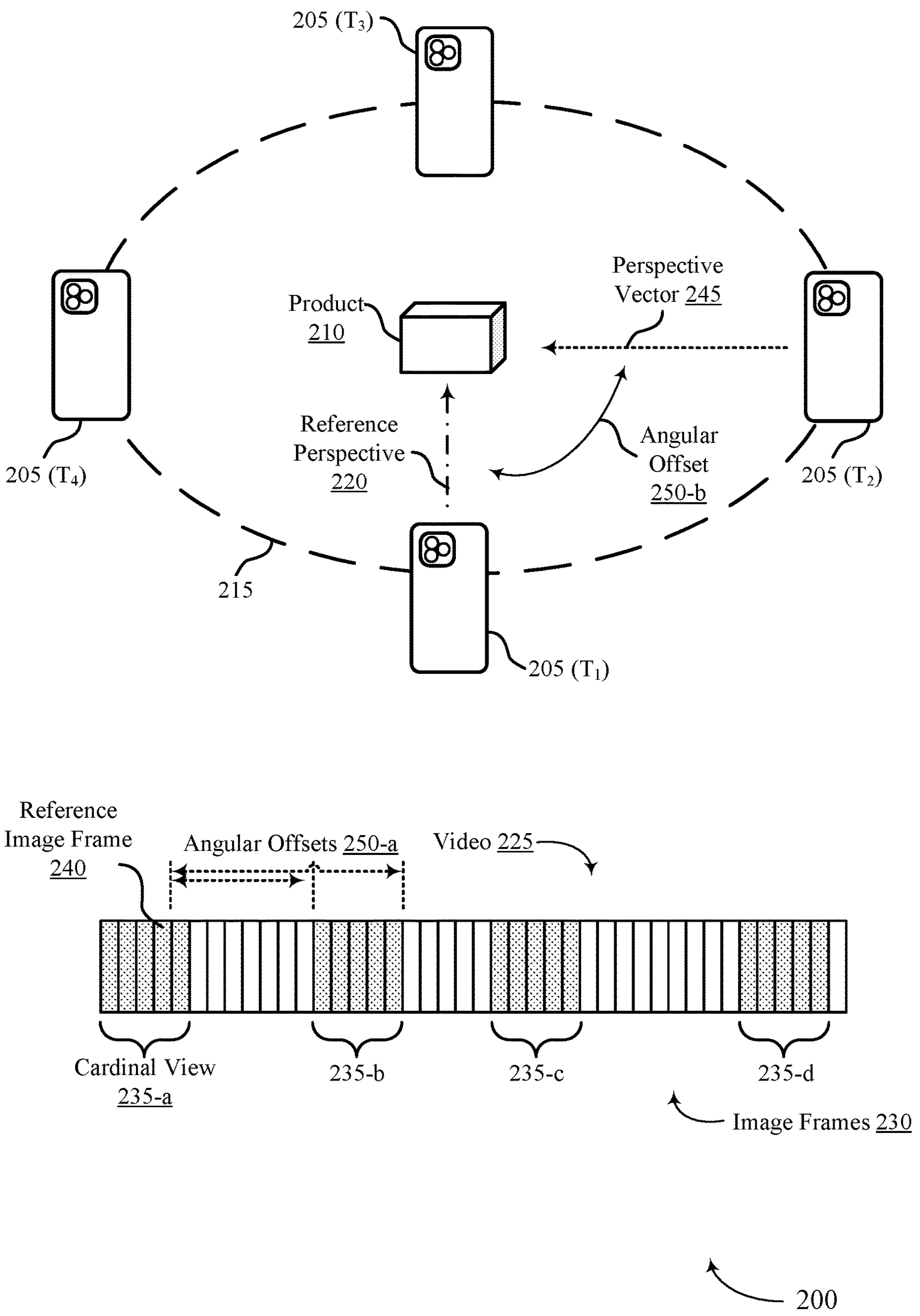
FIG. 2 illustrates an example of a guided capture system that supports guided capture methodologies in accordance with aspects of the present disclosure.

FIG. 2 illustrates an example of a guided capture system 200 that supports guided capture methodologies in accordance with aspects of the present disclosure. Aspects of the system 200 may implement, or be implemented by, aspects of the system 100. In particular, the system 200 illustrates guided capture methodologies that enable a system to automatically retrieve image frames for an item listing, as described previously herein.

In some aspects, the system 200 illustrates a client device 205 that is configured to take videos and/or images of a product 210 that is to be listed for sale via an online marketplace. As described previously herein, in order to list products 210 for sale on an online marketplace, sellers may be expected to upload information associated with the product 210, such as a title, a description, and images of the product. The information provided by the seller may be useful for potential buyers when making purchasing decisions. In particular, the quality of images for a particular product 210 has been found to have a significant impact as to whether potential buyers will view the listing for the product 210, and eventually purchase the product 210. As such, it is important for sellers to upload high quality images that accurately depict or represent the product 210. In other words, sellers may be expected to upload images taken from "cardinal views" of the product 210 (e.g., views that show important/expected features of the product 210).

Some online marketplaces offer tools or guides that prompt a seller for images of products 210 from certain perspectives (e.g., from the cardinal views of the product) to provide a comprehensive representation of the product 210 for the item listing. For example, some online marketplaces may prompt the seller to include images of the product 210 from the front, the back, the top, and both sides. However, some sellers may not upload images from all the requested perspectives (such as if the back side of the product 210 exhibits a defect), and the system may be unable to determine if uploaded images are actually taken from the requested perspectives. Moreover, such techniques may require users to take multiple images, save the images, and upload the respective images in order, which may be clunky and time consuming.

There are several techniques which have been implemented in some systems to attempt to identify/confirm whether images of a product are taken from "cardinal views" associated with the product, including light detection and ranging (LiDAR) techniques, singular value decomposition (SVD)/orthogonality techniques, cardinality classification techniques, 6D pose estimation techniques, and 3D bounding box techniques. Some systems have implemented LiDAR, SVD, and orthogonality techniques to identify whether images are associated with cardinal views of a product due to the fact that such techniques are simple to run. However, such techniques are not scalable, and do not work in all contexts (e.g., do not work for some angles). Moreover, not all users may have client devices (e.g., phones) that are enabled with LiDAR functionality. Further, such techniques may not work in a cluttered environment (e.g., cases where images depict multiple objects), and such techniques are not deep learning based (e.g., multi-task/central encoder setup may not be possible).

Similarly, cardinality classification techniques may be simple to build and run on a real-time mobile platform. However, in the context of cardinality classification techniques, there may be way for a system to identify whether cardinal views of the product 210 have been missed, and/or guide users to take new images if cardinal views are missed. Additionally, such cardinality classification techniques may not generalize well enough for new/different types of objects/products 210, may not work in cluttered environments (e.g., cases where images depict multiple objects), and may not facilitate identification of cardinal views in the future (e.g., for future products 210 listed for sale).

The 6D pose estimation techniques and 3D bounding box techniques for identifying images taken from cardinal views of a product 210 also exhibit their own advantages and disadvantages. For example, in 6D pose estimation techniques may be generalizable for different contexts, and may provide the user with enough data to accurately capture images from cardinal perspectives. However, such techniques are generally implemented in large networks, and may therefore be difficult to scale. Moreover, training may require a 3D model of the product 210 to be listed, which may be difficult or impossible to acquire for large quantities of products 210 to be listed for sale. Comparatively, 3D bounding box techniques may be used as another way of achieving pose estimation, and may generally be faster than 6D pose estimation techniques. However, 3D bounding box techniques may require a large classification network and/or depth maps of products 210, making such techniques difficult to implement in practice.

Accordingly, aspects of the system 200 may be configured to implement techniques for guided image capture used to retrieve product images that may be used to automatically generate a product listing. In particular, the system 200 may support techniques (e.g., computer vision-guided image capture techniques) for operating an online marketplace which enables sellers to quickly and efficiently upload images of products that are to be listed for sale on the online marketplace.

For example, referring to the system 200, a user associated with the client device 205 may generate a user input indicating the product 210 that is to be listed for sale via an online marketplace. In some cases, the client device 205 may transmit the user input to a server, such as a server associated with the subsystem 125 illustrated in FIG. 1 (e.g., cloud platform 115, etc.). In some cases, the user input may indicate information associated with the product 210 that is to be listed for sale, such as a title or description of the product 210, attributes or features of the product 210, a product type, a product category, a listing price, or any combination thereof.

For example, a user associated with the client device 205 may indicate that they wish to list a vehicle for sale (e.g., the product 210 is a vehicle). In such cases, the user may indicate "automobile" or "vehicle" as the product type and/or product category, and may indicate other information associated with the vehicle, such as a make, model, year, and the like. Other types of products (or product types/categories) may include, but are not limited to, footwear (e.g., sneakers), clothing (e.g., shirts, jackets, pants), accessories (e.g., watches, necklaces, bracelets, earrings), sporting equipment (e.g., golf clubs, tennis rackets), and the like.

In some aspects, the server may determine one or more cardinal views 235 associated with the product 210. As described previously herein, the "cardinal views 235" for the product 210 may include ranges of viewing angles/perspectives which depict the product 210 from important angles that are expected to be included for an item listing for the product 210. In some cases, the server may determine the cardinal views 235 of the product 210 based on the product type, the product category, or both, which were indicated via the user input at 515. In particular, different types of products 210 may be associated with different cardinal views 235. For example, cardinal views 235 (e.g., expected viewing perspectives) for a vehicle may include views from the front, back, and two sides. Comparatively, cardinal views 235 of a watch may include only views from the front (showing the watch face) and the back.

In additional or alternative implementations, the server may determine a reference perspective 220 of the product 210 based on the product type, the product category, or both, which were indicated via the user input at 515. For example, in the context of a vehicle, the reference perspective may include a view that depicts the vehicle from the front (e.g., head-on).

In some aspects, the server may transmit, to the client device 205, an instruction for the client device 205 to capture a video 225 of the product 210 from a set of multiple perspectives including the reference perspective 220. In other words, the client device 205 may include an instruction for the user to capture a video 225 of the product 210 along a trajectory 215 that is configured to capture image frames 230 of the product 210 from the one or more carinal views 235.

For example, the server may transmit a message to the client device 205 that instructs the user to take a video 225 of the vehicle as the user walks around the vehicle that is to be listed for sale (e.g., as the user walks along trajectory 215). By way of another example, in cases where the product 210 includes a watch or some other small object, the instruction may instruct the user regarding how to hold and/or rotate/manipulate the product 210 as the user takes a video 225, or how to take a video 225 of the product 210 as the product 210 sits on a table or the floor.

In some aspects, the instruction may include steps or other guidance to help the user take a high-quality video 225, such as prompts that instruct the user to move the client device 205 faster or slower as they take the video 225, suggestions to adjust a lighting or background used in the video 225, suggestions to zoom in or out, instructions to move closer or further away from the product 210, and the like. For example, in some cases, the instruction may include a suggestion or indication for the user to start the video 225 from the reference perspective 220 (e.g., "Take a video 225 of the vehicle by starting at the front of the vehicle, and slowly walking around the vehicle counter-clockwise."). In such cases, the server may make an assumption that the video 225 starts from the reference perspective 220 of the product 210 (e.g., the first image frame 230, or one of the beginning image frames 230, includes a reference image frame 240 taken from the reference perspective 220).

Subsequently, the client device 205 may capture a video 225 of the product 210, and may provide the video 225 to the server. For example, the client device 205 may capture the video 225 as the user moves the client device 205 around the product 210 (or moves the product 210 relative to the client device 205) according to the guidance trajectory 215. In this regard, the trajectory 215 illustrates the movement of the client device 205 while capturing the video 225 at Time 1 ($T_1$), Time 2 ($T_2$), Time 3 ($T_3$), and Time 4 ($T_4$). The video 225 may include multiple image frames 230 which capture the product 210 from multiple perspectives, including the reference perspective 220, perspectives associated with the cardinal views 235, or both.

The client device 205 may capture the video 225 based on transmitting the user input, receiving the instruction to capture the video 225, or both. For example, the client device 205 may capture the video 225 in accordance with steps and/or guidance provided via the instruction received from the server. For instance, in some cases, the user may capture the video 225 using the client device 205 by starting the video 225 at the reference perspective 220, as prompted via the instruction. Additionally, or alternatively, the user may start the video 225 of the product 210 from any perspective, where the server is configured to identify the reference perspective 220 within the video 225 (as will be described in further detail herein).

In some cases, the server may be configured to automatically adjust settings of the client device 205 (e.g., settings of the camera of the client device 205) as the client device 205 captures the video 225. For example, the server may be configured to evaluate the video 225 in real time (or near-real time) to adjust settings of the client device 205, such as zoom, contrast, etc., in order to improve a quality of the video 225.

In some cases, the user may manually initiate the video 225, end the video 225, and send the video 225 to the server. In other cases, the client device 205 may be configured to automatically start taking the video 225, determine when the video 225 ends (e.g., such as when the video 225 has captured the product 210 from all cardinal views 235), and send the video 225 to the server. In some cases, the video 225 may be transmitted or streamed to the server in real time, or near-real time, where in other cases the video 225 may be transmitted to the server after the video 225 has been ended.

In some aspects, the server may be configured to assume that the product 210 does not move throughout the video 225, and that the client device 205 moves relative to the product 210 according to trajectory 215. In additional or alternative implementations, the server may be configured to assume that the client device 205 remains relatively still while the user manipulates (e.g., moves, rotates) the product 210 relative to the client device 205. In some cases, the assumption may be based on the product type/category associated with the product 210 (e.g., the server assumes a vehicle remains still in the video as the user moves, but may assume a small object is manually moved/manipulated relative to the client device 205). For bottom or other custom views of the product 210 (e.g., images of an underside of the vehicle, back side of a watch, etc.), the server may prompt the user to capture image frames 230 from such views manually, in which cases the bottom/custom views may or may not be depicted in the video 225.

In some aspects, the client device 205 may transmit additional data along with the video 225, such as spatial location data associated with the client device, acceleration/movement data associated with the client device 205 over the time that the video 225 was captured, and the like. For example, the client device 205 may transmit spatial location data associated with a relative geographical/spatial location of the client device 205 as the client device 205 moved along trajectory 215 to capture the video 225. Additionally, or alternatively, the client device 205 may transmit movement data, such as acceleration data, associated with the movement of the client device 205 as the client device 205 captured the video 225.

In some aspects, upon receiving the video 225, the server may determine or calculate a set of perspective vectors 245 associated with the set of image frames 230 of the video 225. In some aspects, each perspective vector 245 may include a vector between the product 210 depicted in the respective image frame 230 and the client device 205 at a time when the respective image frame 230 was captured by the client device 205. In other words, each perspective vector 245 may define a vector between the client device 205 and the product 210 at the time the respective image frame 230 was taken. For example, the perspective vector 245 illustrates a vector between the client device 205 and the product 210 at $T_3$ (e.g., perspective vector 245 for image frame taken at $T_3$).

In some aspects, the set of perspective vectors 245 may be calculated based on spatial location data (e.g., acceleration data, geographical location data) received from the client device 205, a simultaneous localization and mapping operation performed on the set of image frames 230, or both. For instance, the client device 205 may indicate a relative location (e.g., spatial location data) of the client device 205 as the user walked around the vehicle with the client device 205 to capture the video 225. In this example, server may use the spatial location data to calculate the perspective vectors 245 for the respective image frames 230 of the video 225.

Moreover, the server may determine the reference perspective 220 associated with the video 225 of the product 210. In particular, the server may be configured to identify one or more image frames 230 of the video 225 which depict the product 210 from the reference perspective 220 (e.g., reference image frame 240). As described previously herein, the reference perspective 220 may be determined based on the product type and/or product category associated with the product 210 depicted in the video 225.

In some cases, the server may be configured to identify the first image frame 230 (or one of the beginning image frames 230) of the video 225 as an image frame 230 associated with the reference perspective 220 (e.g., reference image frame 240), such as in cases where the server instructs the user to start the video 225 from the reference perspective 220. In other cases, the server may be configured to analyze the video 225 to determine one or more reference image frames 240 which are associated with the reference perspective 220, such as in cases where the server does not specify that the video 225 is to be started from the reference perspective 220. In some cases, the server may be configured to identify the reference perspective 220/reference image frame 240 based on the determined perspective vectors 245 of the respective image frames 230.

In some aspects, the server may be configured to determine or calculate angular offset 250 between the reference perspective 220 and the one or more cardinal views 235, between the reference perspective 220 and the respective image frames 230 of the video 225, or both. The angular offsets 250 may be used to determine a relative arrangement or position of the cardinal views 235/image frames 230 relative to the reference perspective 220.

For example, the server may be configured to calculate a first set of angular offset 250 (e.g., angular offset 250-*a*) between the reference perspective 220 and the set of cardinal views 235, and a second set of angular offsets 250 (e.g., angular offset 250-*b*) between the reference perspective 220 and the perspectives (e.g., perspective vectors) associated with each image frame 230 of the video 225. In some cases, the angular offsets 250 (e.g., comparisons between angular offsets 250) may be used to determine whether each image frame 230 depicts the product 210 from a cardinal view 235. In this regard, a comparison of the angular offsets 250 of the cardinal views 235 and respective image frames 230 may be used to identify which image frames 230 of the video 225 depict the product 210 from the cardinal views 235 (and may therefore be used as images for the item listing of the product 210), and which image frames 230 do not depict the product 210 from the cardinal views 235.

For example, as shown in FIG. 2, the server may determine a first angular offset 250-*a* of 30-35° between the reference perspective 220 (e.g., reference image frame 240) and the second cardinal view 235-*b* (e.g., the second cardinal view 235 is offset 30-35° relative to the reference perspective 220). In this example, the server may be configured to determine that image frames 230 associated with angular offsets 250 between 30-35° relative to the reference perspective 220 may depict the product 210 from the second cardinal view 235-*b*. For instance, if the server determines an angular offset 250-*b* associated with an image frame is 32°, the server may determine that the image frame depicts the product 210 from within the second cardinal view 235-*b*.

Additionally, or alternatively, the server may determine image quality metrics associated with the image frames 230 of the video 225, and may determine whether the respective image frames 230 (e.g., image quality metrics of the image frames 230) satisfy one or more image quality criterion. Image quality criterion used to evaluate the image frames 230 may include, but are not limited to, a lighting criteria, a focus criteria, an object position criteria, and the like. In other words, the server may evaluate whether each image frame 230 has sufficient lighting, whether the respective image frame 230 is properly focused on the product 210, whether the product 210 is centered within the image frame 230, and the like. Stated differently, the server may evaluate a relative quality of each image frame 230 to determine if the respective image frames 230 are of high enough quality to be included in an item listing for the product 210.

In some aspects, the server may extract a subset of image frames 230 from the set of image frames 230 of the video 225. In particular, the server may extract a subset of image frames 230 that depict the product 210 from the one or more cardinal views 235 associated with the product 210, where the cardinal views 235 are determined relative to the reference perspective 220.

For example, the server may compare angular offsets 250 between the reference perspective 220 and the cardinal views 235 (e.g., angular offset 250-*a*) with angular offsets 250 between the reference perspective 220 and each image frame 230 (e.g., angular offset 250-*b*) to determine which image frames 230 depict the product 210 from the cardinal views 235, and may therefore extract a subset of image frames 230 which depict the product 210 from the cardinal views 235. For instance, the server may determine a first angular offset 250-*a* of 30-35° between the second cardinal view 235-*b* and the reference perspective 220 (e.g., the cardinal view 235 is offset 30-35° relative to the reference perspective 220). In this example, the server may be configured to determine that image frames 230 associated with angular offsets 250 (e.g., angular offset 250-*b*) between 30-35° relative to the reference perspective 220 may depict the product 210 from the second cardinal view 235-*b*.

In some cases, the server may be configured to extract one or more image frames 230 for each respective cardinal view 235. For instance, as shown in FIG. 2, the server may be configured to extract at least one image frame 230 taken within each of the first cardinal view 235-*a*, the second cardinal view 235-*b*, the third cardinal view 235-*c*, and the fourth cardinal view 235-*d*.

Additionally, in some aspects, the server may be configured to extract image frames 230 which satisfy the one or more image quality criterion. In this regard, the server may be configured to extract image frames 230 which: (1) depict the product 210 from a cardinal view 235, and (2) satisfy image quality criterion. As noted previously herein, the image quality criterion may include, but are not limited to, a lighting criteria, a focus criteria, an object position criteria, and the like.

In cases where the server does not identify any image frames 230 which depict the product 210 from a respective cardinal view 235 (and/or which do not satisfy the image quality criterion), the server may prompt the user to take a new video 225, prompt the user to take individual image frames 230 of the product 210 from the respective cardinal view 235, or both.

Subsequently, the server may generate an item listing that lists the product 210 for sale via the online marketplace. In particular, the server may generate the item listing based on (e.g., using) the subset of image frames 230 which were extracted from the video 225. Additionally, or alternatively, the server may generate the item listing based on (e.g., using) information provided via the user input, such as a title/description of the product 210 (e.g., make, model, year, dimensions), the product type, the product category, a listing price, and the like.

In some cases, the server may transmit, to the client device 205, a draft item listing for the product 210. In some implementations, the server may provide the draft item listing to the user to enable the user to approve/confirm the item listing, and/or modify the item listing prior to publishing. Accordingly, in such cases, the client device 205 may transmit, to the server, a user input indicating a confirmation/approval of the item listing, one or more modifications or additions to the product 210 listing, or both. For example, the user may modify the title and/or description of the item listing, and approve the modified item listing for publishing.

In some aspects, the server may publish the item listing for the product 210 via the online marketplace. In some cases, the server may publish the item listing based on receiving approval/confirmation from the client device 205. In additional or alternative implementations, the server may publish the item listing without explicit user approval confirmation. After publishing, other users may be able to view the item listing, make bids to purchase the product 210, and the like. In this regard, after publishing the item listing, the server may facilitate the exchange of messages, information, and compensation between the user listing the product 210 for sale, and other potential buyers for the product 210.

Figure 3:
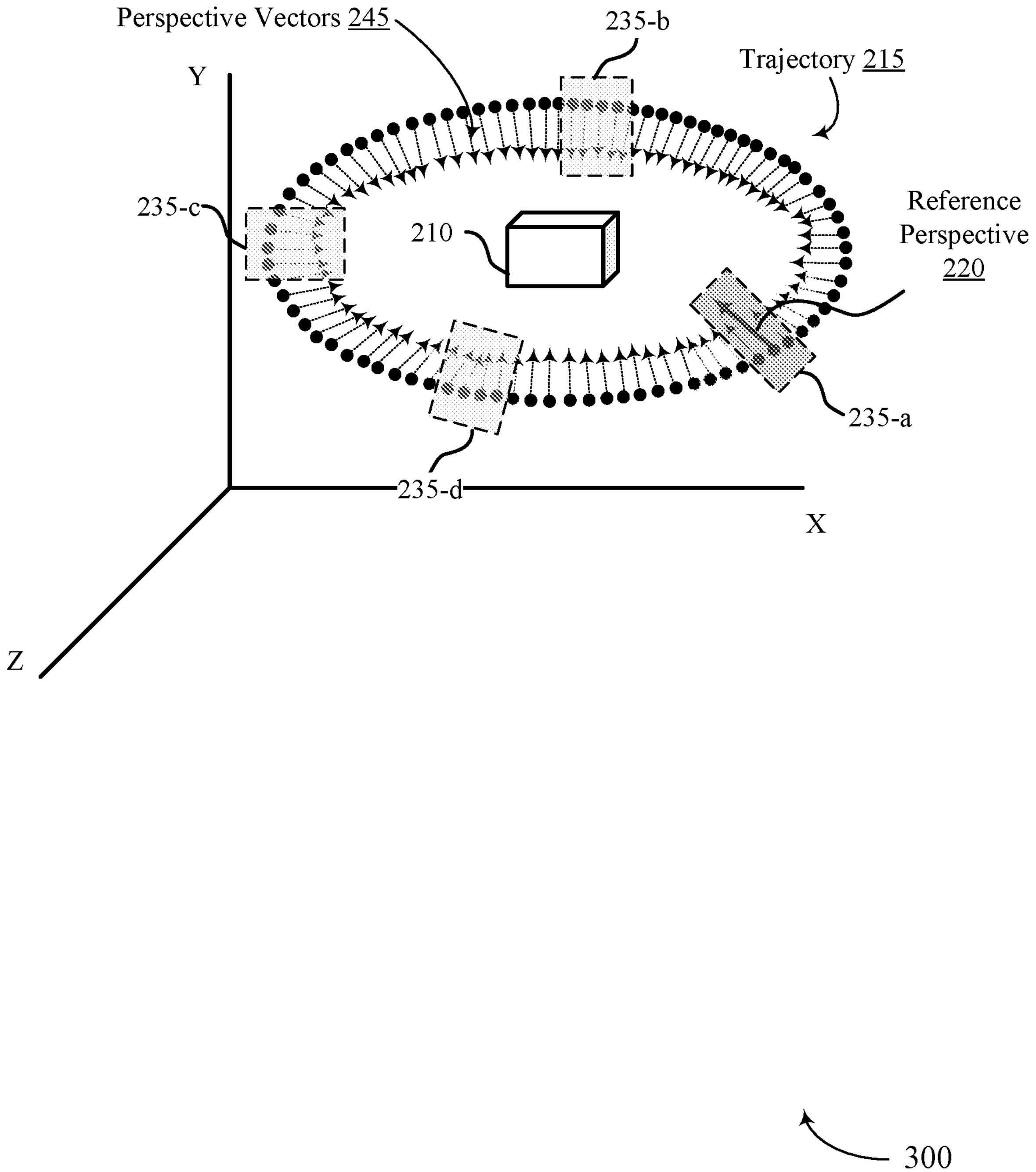
FIG. 3 illustrates an example of a guided capture diagram that supports guided capture methodologies in accordance with aspects of the present disclosure.

FIG. 3 illustrates an example of a guided capture diagram 300 that supports guided capture methodologies in accordance with aspects of the present disclosure. Aspects of the guided capture diagram 300 may implement, or be implemented by, aspects of the system 100, the system 200, or both.

The guided capture diagram 300 illustrates a trajectory (e.g., trajectory 215) of the client device 205 in 3D space as the client device 205 moves around the product 210 to capture the video 225. In particular, the guided capture diagram 300 illustrates individual image frames 230 of the video 225 which were captured from different perspectives relative to the product 210. In this regard, the individual dots illustrated in the guided capture diagram 300 illustrate the location/position of the client device 205 at the moment each respective image frame 230 was captured, where the arrows extending from the dots illustrate the viewing directions (e.g., perspective, perspective vectors 245) of the client device 205 in 3D space (e.g., X, Y, Z vector) when capturing the respective image frames 230.

The guided capture diagram 300 illustrates the cardinal views 235-*a*, 235-*b*, 235-*c*, 235-*d* associated with the product 210 in 3D space. In some implementations, the server may be configured to construct the guided capture diagram 300 (or a similar diagram) based on information received from the client device 205 in order to determine whether respective image frames 230 depict the product from within the respective cardinal views 235, where the cardinal views 235 are determined relative to the reference perspective 220. In particular, the server may be configured to automatically detect (and label) the respective cardinal views 235 relative to the reference perspective 220, and evaluate whether each image frame 230 was taken from the cardinal views 235.

For example, upon receiving the video 225 and/or other information from the client device 205 (e.g., spatial location data, acceleration data, etc.), the server may be configured to determine 3D view vectors (e.g., perspective vectors 245) associated with each respective image frame 230. In such cases, the server may be configured to project the perspective vectors 245 onto the gravity plane (e.g., X/Y plane, or Z/Y plane), and calculate an angle (e.g., angular offset 250) between the reference perspective 220 and each respective view/perspective vector 245. If angular offset 250 for a given image frame satisfies a threshold (e.g., is within the angular offset 250 range associated with a cardinal view 235), then the server may be configured to determine that the image frame 230 was taken from the cardinal view.

Figure 4:
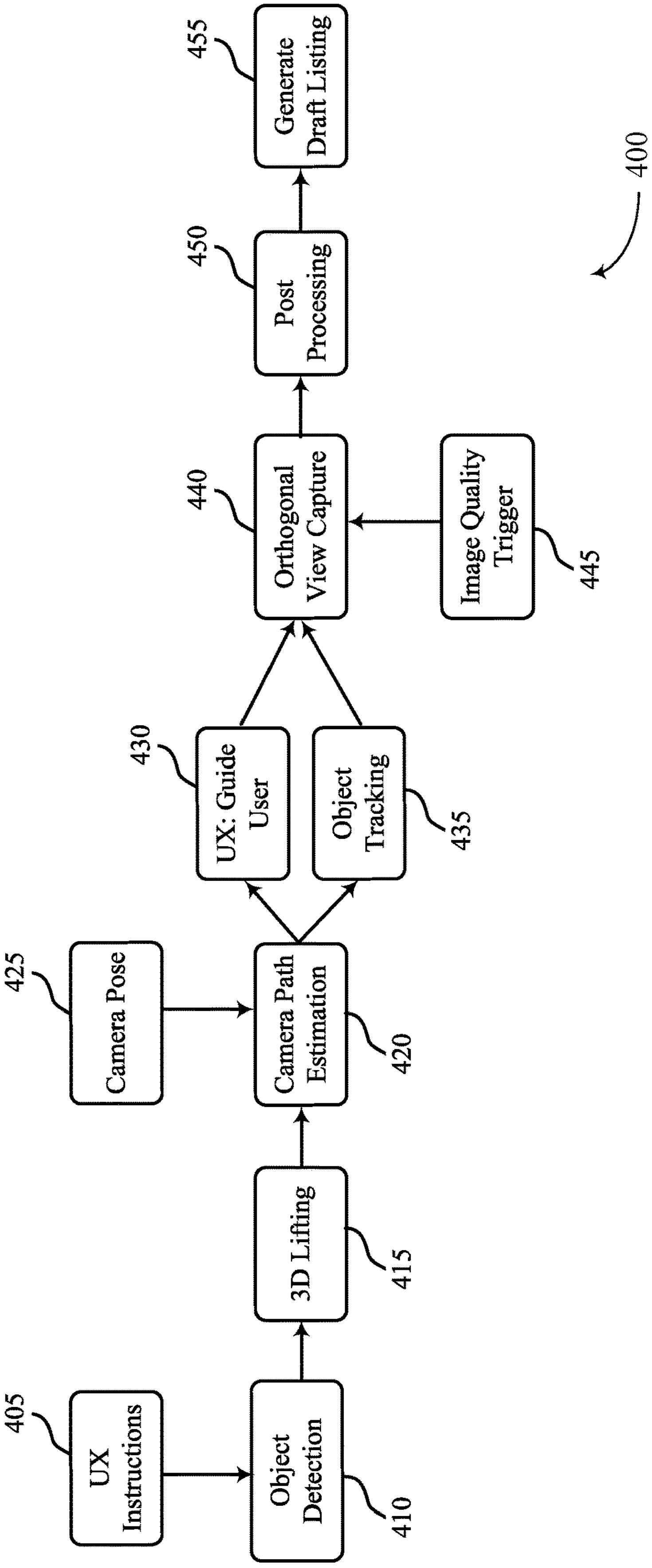
FIG. 4 illustrates an example of a flowchart that supports guided capture methodologies in accordance with aspects of the present disclosure.

FIG. 4 illustrates an example of a flowchart 400 that supports guided capture methodologies in accordance with aspects of the present disclosure. Aspects of the flowchart 400 may implement, or be implemented by, aspects of the system 100, the system 200, the guided capture diagram 300 or any combination thereof.

In particular, the flowchart 400 illustrates techniques for computer vision guided image capture techniques that enable image frames to be automatically selected for inclusion within an item listing, ad described previously herein. The respective steps/functions illustrated in the flowchart 400 may be implemented by one or more of the components illustrated in FIGS. 1 and 2, such as a client device 110, 205, a server (e.g., subsystem 125, cloud platform 115), and the like.

At 405, a server may transmit instructions (e.g., UX instructions) for a client device to capture a video of a product that is to be listed for sale via an online marketplace. In some aspects, the instructions may include steps or other guidance to help the user take a high-quality video, such as prompts that instruct the user to move the client device faster or slower as they take the video, suggestions to adjust a lighting or background used in the video, suggestions to zoom in or out, instructions to move closer or further away from the product, and the like.

At 410, upon receiving a video from the client device, the server may perform object detection to identify/detect the product that is to be listed for sale within the video. In particular, the server may perform object detection to identify the product within each respective image frame of the video. In some aspects, in order to preform object detection, the server may use depth maps and/or sparse points (e.g., depth maps vs. sparse points), and may use input selection as a proxy. At 415, the server may perform 3D lifting on the received video (e.g., on the individual image frames of the received video).

In some aspects, techniques described herein may utilize computer vision techniques (e.g., computer vision algorithmic confidence) to perform one or more of the steps/processes illustrated in FIG. 4. For example, in principle with computer vision, a system may perform object detection at 410 (e.g., classify the object into one or more item categories), and may determine a confidence level for classification of the product (e.g., a confidence level that the product at issue is properly classified into a "automobile" category), as well as bounds for the item. In some implementations, the system may contextually prompt special guidance when there is high confidence that the product is categorized into a supported product category (e.g., supported vertical), and may still provide composition guidance if classification is unavailable or unsupported (e.g., in cases where the product can not be confidently categorized into a category). In this regard, aspects of the present disclosure are directed to a scalable system that is configured to facilitate creation of product listings for products across a complex library of items/categories in a market, such as an online marketplace.

At 420, the server may perform camera path estimation. In other words, the server may estimate the trajectory 215 (or path) of the client device as the client device takes the video. For example, as described previously herein, the server may determine or calculate perspective vectors 245 associated with each respective image frame. In other words, the server may determine the relative position/movement of the client device relative to the product. In some cases, the server may perform camera path estimation in real time or near-real time, or may perform camera path estimation after receiving the full video.

At 425, as part of the camera path estimation, the server may determine or receive camera pose information, such as through an augmented reality (AR) platform such as ARKit. In other words, the server may perform camera pose and/or path estimation using ARKit data points.

In some aspects, the server may leverage various sensors of the client device to perform pose/path estimation, such as sensors of the camera, gyroscope (e.g., accelerometers), and the like. Using such information, the server may be configured to calculate the relative portion of the user/client device and the product by leveraging AI-based object detection, scene 3D point and camera 3D pose information.

At 430, the server may use an interface of the client device to guide the user to take the video. In some cases, the server may guide the user at 430 based on performing the camera path/pose estimation at 420 and 425. For example, based on the camera path estimation, the server may instruct the user to move around the product slower/faster, to move closer/further away from the product, and the like. In other words, using the pose/movement information, the server may guide the user around the product/object to capture high quality cardinal frames of the product corresponding to cardinal views (e.g., front/back, sides, top/bottom views) in order to populate the item listing for the product.

In some aspects, once the product is recognized as supported (e.g., once the system determines the product is associated with a supported item category or item vertical), the user may opt into special guidance for generating an item listing, in which a template set of points of interest is generated and prompted to the user. The points of interest generated and displayed to the user may be determined/optimized based on the product category, what parameters/characteristics for similar products/categories have succeeded in the marketplace, and the like. For example, the system may determine that potential buyers respond more favorably (e.g., view, place bids, purchase, etc.) to item listings of vehicles that include side profile views, and respond more favorably to item listings of shoes that include perspective views. In this regard, different points of interest (and therefore guidance provided to the user) may be generated and displayed to the user depending on the type of product at issue. In some cases, specific formats such as videos, images, or 3D images may also be packaged in the category template (e.g., different types of media formats may be prompted for different types of products).

At 435, the server may perform object tracking. Once again, the server may perform object tracking at 435 based on performing the camera path/pose estimation at 420 and 425. For example, in some cases, the server may perform object tracking 435 using ARKit data points.

At 440, the server may perform orthogonal view (e.g., cardinal view) capture. In other words, the server may identify cardinal views of the product and/or identify which image frames were taken from cardinal views of the product. In some cases, the server may perform cardinal view detection based on input received from the user (e.g., user indicating parts of the video which were taken from cardinal views), based on training data, based on calculated perspective vectors/angular offsets, and the like. In some aspects, the server may be afforded some error margin for identifying cardinal views. As noted previously herein, cardinal views may be determined relative to the reference perspective of the product. As described previously herein, the server may be configured to automatically extract image frames from the video which depict the product from the cardinal views.

In some cases, techniques described herein may enable the server to utilize artificial intelligence (AI) and/or computer vision-guided techniques to alleviate issues associated with selecting images for item listings by recognizing the product and its principal aspects (e.g., front/back, sides, top/bottom), and automatically capturing high-quality cardinal view images of the product. By doing so, techniques described herein may improve the quality of images used for the product listing, and reduce the effort required to generate high quality item listings. In some cases, the cardinal views (e.g., cardinal/principal aspects/views) may be defined at the server, such as via a category manager. Moreover, different cardinal views may be defined for different types/categories of products. For example, the view requirements/expectations of a watch may be slightly different from a sneaker (e.g., potential buyers may expect to see a close-up view of a watch face, but may not expect such a close up of the inside of the shoe).

At 445, the server may be configured to perform image quality triggering. In other words, the server may evaluate whether image frames satisfy one or more image quality criteria, such as a lighting criteria, a focus criteria, an object position criteria, and the like. Stated differently, the server may implement one or more algorithms or procedures to ensure that the product is visible in the extracted image frames, that there is no clutter within the image frames (e.g., no other objects are visible), etc. In some cases, the server may be configured to extract image frames for the item listing which (1) are taken from a cardinal view, and (2) satisfy the image quality criterion.

In this regard, the system may also generate and display instructions or guidance to the user related to general image quality, such as guidance related to exposure, focus, center composition, and clutter in the space captured by the video taken by the user. The result is a catered listing with media that increases the likelihood of sale, as well as the reduction of returns by the purchaser by clarifying the details of the listing to the buyer.

At 450, the server may be configured to perform post-processing on the extracted image frames. In some aspects, post processing may include one or more operations that are used to modify one or more parameters/characteristics of the extracted image. In other words, the server may automatically adjust camera settings/parameters to ensure image frames with sufficient image quality. In this regard, post processing operations may include any image processing operation used to prepare extracted image frames for inclusion within the item listing, such as background removal operations (so that image frames depict only the product an no background), optical character recognition (OCR) operations, aspect/attribute inference operations, and the like.

At 455, the server 455 may generate a draft item listing for the product that may be used to list the product for sale via an online marketplace. In particular, the server may generate the item listing based on (e.g., using) the subset of image frames which were extracted from the video. Additionally, or alternatively, the server may generate the item listing based on (e.g., using) information provided via the user input, such as a title/description of the product (e.g., make, model, year, dimensions), the product type, the product category, a listing price, and the like. In some cases, the server may suggest information that will be used for the item listing, such as a recommended price (e.g., price guidance), and the like.

Accordingly, as described herein, aspects of the present disclosure are directed to techniques used to dynamically steer or guide a seller to capture images of a product for an item listing based on a number of factors or parameters, including the user's skill level when it comes to taking videos/images of the product, recognized product categories (e.g., item category information, such as "sporting equipment," "vehicles," "clothing," "accessories," etc.), and the like. In this regard, techniques described herein may help optimize and improve the media (e.g., images) used for the item listing using object detection, classification, recommended points of interest specific to the item's vertical needs in the market, and overall image composition guidance.

Figure 5:
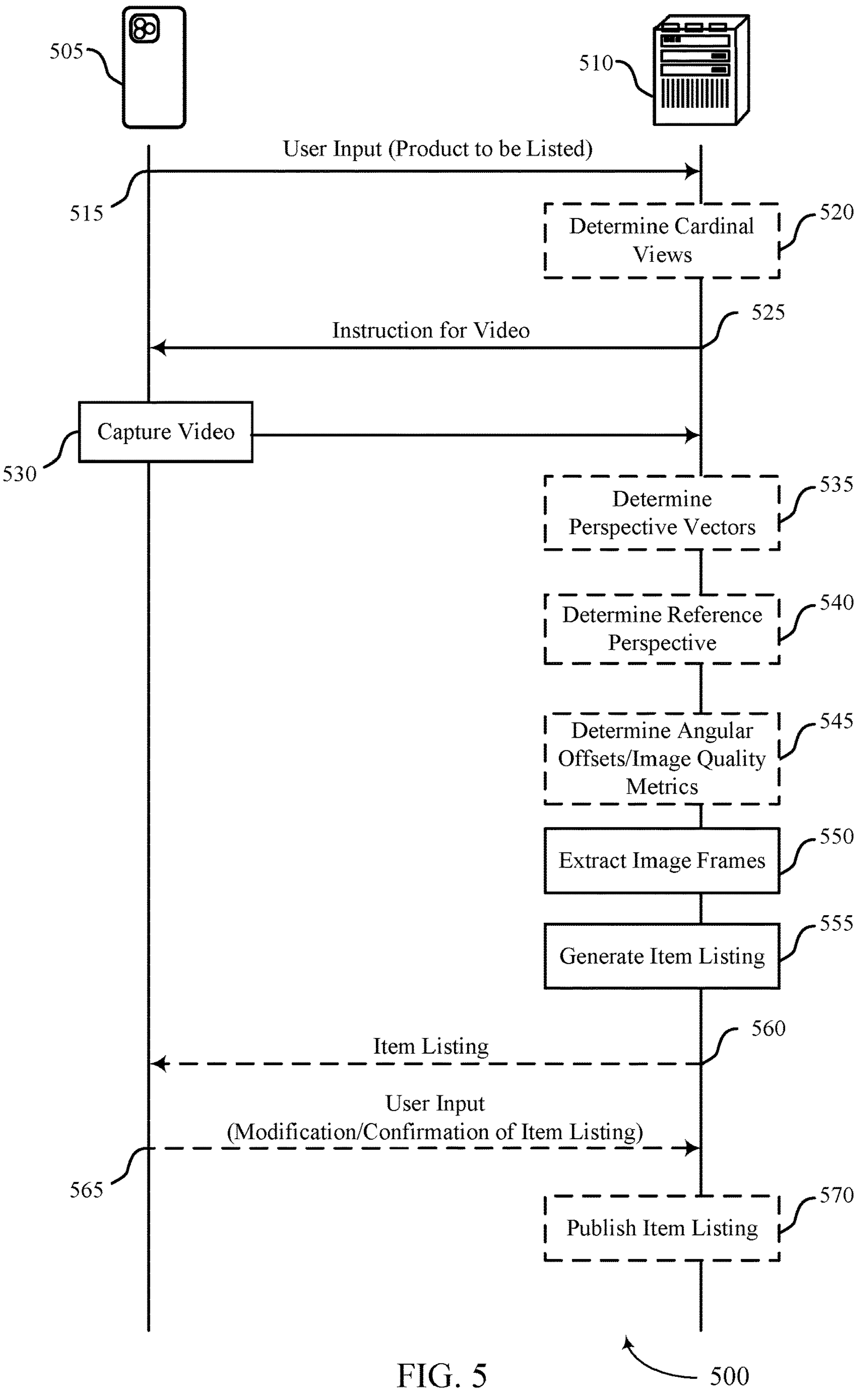
FIG. 5 illustrates an example of a process flow that supports guided capture methodologies in accordance with aspects of the present disclosure.

FIG. 5 illustrates an example of a process flow 500 that supports guided capture methodologies in accordance with aspects of the present disclosure. Aspects of the process flow 500 may implement, or be implemented by, system 100, system 200, diagram 300, flowchart 400, or any combination thereof.

The process flow 500 may include a client device 505 and a server system 510, which may be examples of corresponding devices described herein. For example, the client device 505 may be an example of a user device 110 as described with reference to FIGS. 1-4. Similarly, the server system 510 may be an example of the subsystem 125 as described with reference to FIGS. 1-4.

At 515, the server system 510 may receive, from the client device 505, a user input indicating a product that is to be listed for sale via an online marketplace. In some cases, the user input may indicate information associated with the product that is to be listed for sale, such as a title or description of the product, attributes or features of the product, a product type, a product category, a listing price, or any combination thereof. For example, a user associated with the client device 505 may indicate that they wish to list a vehicle for sale. In such cases, the user may indicate "automobile" or "vehicle" as the product type and/or product category, and may indicate other information associated with the vehicle, such as a make, model, year, and the like.

At 520, the server system 510 may determine one or more cardinal views associated with the product. As described previously herein, the "cardinal views" for the product may include ranges of viewing angles/perspectives which depict the product from important angles that are expected to be included for an item listing for the product. In some cases, the server system 510 may determine the cardinal views of the product based on the product type, the product category, or both, which were indicated via the user input at 515. In particular, different types of products may be associated with different cardinal views. For example, cardinal views (e.g., expected viewing perspectives) for a vehicle may include views from the front, back, and two sides. Comparatively, cardinal views of a watch may include only views from the front (showing the watch face) and the back.

In additional or alternative implementations, the server system 510 may determine a reference perspective of the product based on the product type, the product category, or both, which were indicated via the user input at 515. For example, in the context of a vehicle, the reference perspective may include a view that depicts the vehicle from the front (e.g., head-on).

At 525, the server system 510 may transmit, to the client device 505, an instruction for the client device 505 to capture a video of the product from a set of multiple perspectives including the reference perspective. The server system 510 may transmit the instruction at 525 based on receiving the user input at 515, determining the cardinal views at 520, or both.

For example, the server system 510 may transmit a message to the client device 505 that instructs the user to take a video of the vehicle as the user walks around the vehicle that is to be listed for sale. By way of another example, in cases where the product includes a watch or some other small object, the instruction may instruct the user regarding how to hold and/or rotate/manipulate the product as the user takes a video, or how to take a video of the product as the product sits on a table or the floor. In some aspects, the instruction may include steps or other guidance to help the user take a high-quality video, such as prompts that instruct the user to move the client device 505 faster or slower as they take the video, suggestions to adjust a lighting or background used in the video, suggestions to zoom in or out, instructions to move closer or further away from the product, and the like. For example, in some cases, the instruction may include a suggestion or indication for the user to start the video from the reference perspective (e.g., "Take a video of the vehicle by starting at the front of the vehicle, and slowly walking around the vehicle counterclockwise.").

At 530, the client device 505 may capture a video of the product, and may provide the video to the server system 510. As described previously herein, the video may include multiple image frames which capture the product from multiple perspectives, including the reference perspective, perspectives associated with the cardinal views, or both.

The client device 505 may capture the video based on transmitting the user input at 515, receiving the instruction at 525, or both. For example, the client device 505 may capture the video in accordance with steps and/or guidance provided via the instruction at 525. For instance, in some cases, the user may capture the video using the client device 505 at 525 by starting the video at the reference perspective, as prompted via the instruction. Additionally, or alternatively, as described herein, the user may start the video of the product from any perspective, where the server system 510 is configured to identify the reference perspective within the video.

In some cases, the user may have to manually initiate the video, end the video, and send the video to the server system 510. In other cases, the client device 505 may be configured to automatically start taking the video, determine when the video ends (e.g., such as when the video has captured the product from all cardinal views), and send the video to the server system 510. In some cases, the video may be transmitted or streamed to the server system 510 in real time, or near-real time, where in other cases the video may be transmitted to the server system 510 after the video has been ended.

In some aspects, the client device 505 may transmit additional data along with the video, such as spatial location data associated with the client device, acceleration/movement data associated with the client device 505 over the time that the video was captured, and the like.

At 535, the server system 510 may determine or calculate a set of perspective vectors associated with the set of image frames of the video received at 530. In some aspects, each perspective vector may include a vector between the product depicted in the respective image frame and the client device 505 at a time when the respective image frame was captured by the client device 505. In other words, each perspective vector may define a vector between the client device 505 and the product at the time the respective image frame was taken.

In some aspects, the set of perspective vectors may be calculated based on spatial location data received from the client device 505, a simultaneous localization and mapping operation performed on the set of image frames, or both. For instance, the client device 505 may indicate a relative location (e.g., spatial location data) of the client device 505 as the user walked around the vehicle with the client device 505 to capture the video. In this example, server system 510 may use the spatial location data to calculate the perspective vectors for the respective image frames of the video.

At 540, the server system 510 may determine a reference perspective associated with the video of the product. In particular, the server system 510 may be configured to identify one or more image frames of the video which depict the product from the reference perspective (e.g., reference image frames). As described previously herein, the reference perspective may be determined based on the product type and/or product category associated with the video.

In some cases, the server system 510 may be configured to identify the first image frame (or one of the beginning image frames) of the video as an image frame associated with the reference perspective (e.g., reference image frame), such as in cases where the server system 510 instructs the user to start the video from the reference perspective. In other cases, the server system 510 may be configured to analyze the video to determine one or more reference image frames which are associated with the reference perspective, such as in cases where the server system 510 does not specify that the video is to be started from the reference perspective. In some cases, the server system 510 may be configured to identify the reference perspective/reference image frames based on the perspective vectors which were determined/calculated at 535.

At 545, the server system 510 may be configured to determine or calculate angular offsets between the reference perspective and the one or more cardinal views, between the reference perspective and the respective image frames of the video, or both. The angular offsets may be used to determine a relative arrangement or position of the cardinal views/image frames relative to the reference perspective.

For example, the server system 510 may be configured to calculate a first set of angular offsets between the reference perspective and the set of cardinal views, and a second set of angular offsets between the reference perspective and the perspectives (e.g., perspective vectors) associated with each image frame of the video. In some cases, the angular offsets (e.g., comparisons between angular offsets) may be used to determine whether each image frame depicts the product from a cardinal view. In this regard, a comparison of the angular offsets of the cardinal views and respective image frames may be used to identify which image frames of the video depict the product from the cardinal views (and may therefore be used as images for the item listing of the product), and which image frames do not depict the product from the cardinal views.

For example, the server system 510 may determine a first angular offset of 30-35° between a cardinal view and the reference perspective (e.g., the cardinal view is offset 30-35° relative to the reference perspective). In this example, the server system 510 may be configured to determine that image frames associated with angular offsets between 30-35° relative to the reference perspective may depict the product from the cardinal view.

Additionally, or alternatively, at 545, the server system 510 may determine image quality metrics associated with the image frames of the video, and may determine whether the respective image frames (e.g., image quality metrics of the image frames) satisfy one or more image quality criterion. Image quality criterion used to evaluate the image frames may include, but are not limited to, a lighting criteria, a focus criteria, an object position criteria, and the like. In other words, the server system 510 may evaluate whether each image frame has sufficient lighting, whether the respective image frame is properly focused on the product, whether the product is centered within the image frame, and the like. Stated differently, the server system 510 may evaluate a relative quality of each image frame to determine if the respective image frames are of high enough quality to be included in an item listing for the product.

At 550, the server system 510 may extract a subset of image frames from the set of image frames of the video. In particular, the server system 510 may extract a subset of image frames that depict the product from the one or more cardinal views associated with the product, where the cardinal views are determined relative to the reference perspective. In this regard, the server system 510 may extract the subset of image frames at 550 based on receiving the user input at 515, determining the cardinal views at 520, transmitting the instruction at 525, receiving the video at 530, determining the perspective vectors at 535, determining the reference perspective at 540, determining the angular offsets and/or image quality metrics at 545, or any combination thereof.

For example, the server system 510 may compare angular offsets between the reference perspective and the cardinal views with angular offsets between the reference perspective and each image frame to determine which image frames depict the product from the cardinal views, and may therefore extract a subset of image frames which depict the product from the cardinal views. For instance, the server system 510 may determine a first angular offset of 30-35° between a cardinal view and the reference perspective (e.g., the cardinal view is offset 30-35° relative to the reference perspective). In this example, the server system 510 may be configured to determine that image frames associated with angular offsets between 30-35° relative to the reference perspective may depict the product from the cardinal view.

In some cases, the server system 510 may be configured to extract one or more image frames for each respective cardinal view. For instance, if there are four cardinal views, the server system 510 may be configured to extract at least four image frames (e.g., at least one image frame for each cardinal view).

Additionally, in some aspects, the server system 510 may be configured to extract image frames which satisfy the one or more image quality criterion. In this regard, the server system 510 may be configured to extract image frames which: (1) depict the product from a cardinal view, and (2) satisfy image quality criterion. As noted previously herein, the image quality criterion may include, but are not limited to, a lighting criteria, a focus criteria, an object position criteria, and the like.

At 555, the server system 510 may generate an item listing that lists the product for sale via the online marketplace. In particular, the server system 510 may generate the item listing based on (e.g., using) the subset of image frames which were extracted from the video at 550. Additionally, or alternatively, the server system 510 may generate the item listing based on (e.g., using) information provided via the user input at 515, such as a title/description of the product (e.g., make, model, year, dimensions), the product type, the product category, a listing price, and the like.

At 560, the server system 510 may transmit, to the client device 505, a draft item listing for the product which was generated at 555. In some implementations, the server system 510 may provide the draft item listing to the user to enable the user to approve/confirm the item listing, and/or modify the item listing prior to publishing.

At 565, the client device 505 may transmit, to the server system 510, a user input indicating a confirmation/approval of the item listing, one or more modifications or additions to the product listing, or both. For example, the user may modify the title and/or description of the item listing, and approve the modified item listing for publishing.

At 570, the server system 510 may publish the item listing via the online marketplace. After publishing, other users may be able to view the item listing, make bids to purchase the product, and the like. In this regard, after publishing the item listing, the server system 510 may facilitate the exchange of messages, information, and compensation between the user listing the product for sale, and other potential buyers for the product.

Figure 6:
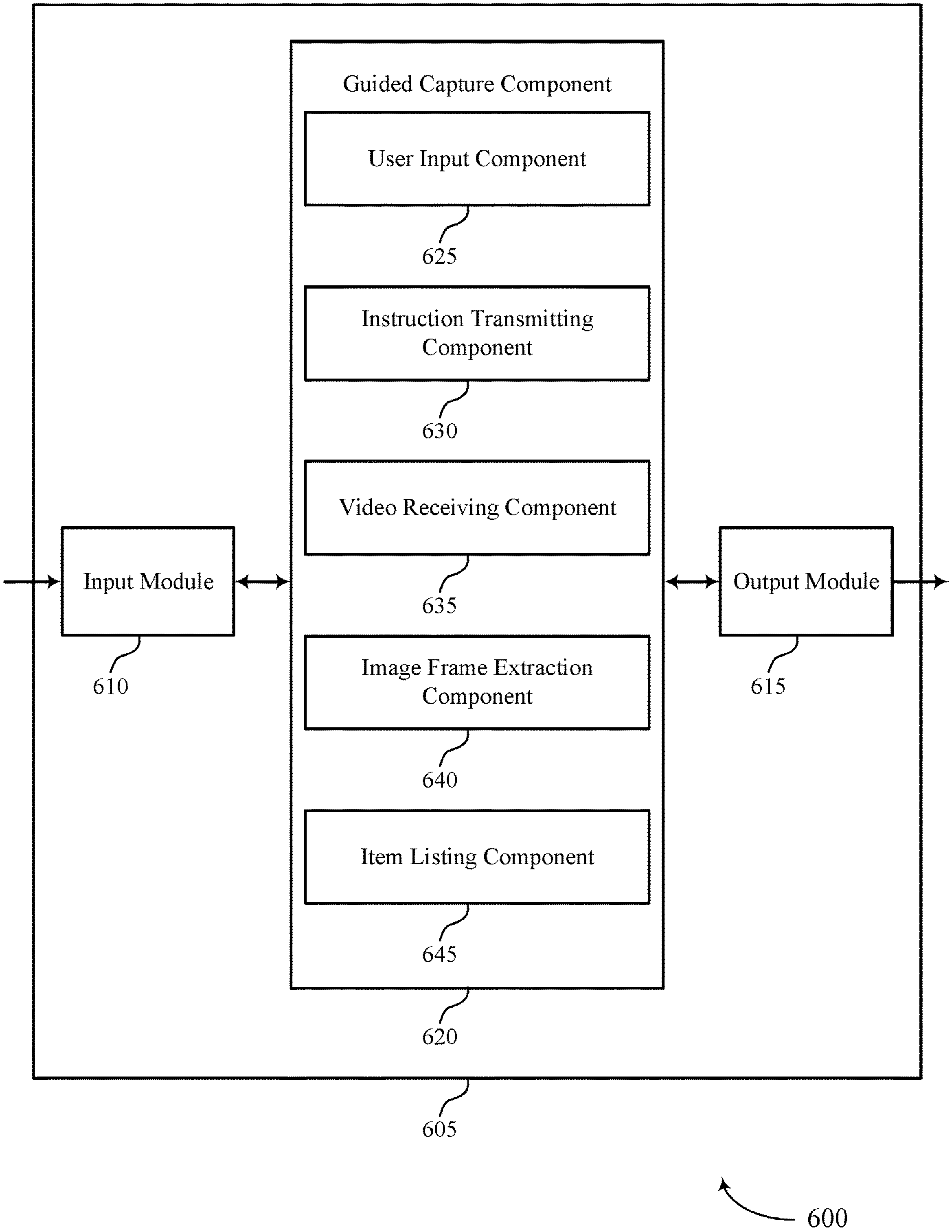
FIG. 6 shows a block diagram of an apparatus that supports guided capture methodologies in accordance with aspects of the present disclosure.

FIG. 6 shows a block diagram 600 of a device 605 that supports guided capture methodologies in accordance with aspects of the present disclosure. The device 605 may include an input module 610, an output module 615, and a guided capture component 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the guided capture component 620 to support guided capture methodologies. In some cases, the input module 610 may be a component of an I/O controller 810 as described with reference to FIG. 8.

The output module 615 may manage output signals for the device 605. For example, the output module 615 may receive signals from other components of the device 605, such as the guided capture component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the guided capture component 620 may include a user input component 625, an instruction transmitting component 630, a video receiving component 635, an image frame extraction component 640, an item listing component 645, or any combination thereof. In some examples, the guided capture component 620, or various components thereof, may be configured to perform various operations (e.g., receiving, monitoring, transmitting) using or otherwise in cooperation with the input module 610, the output module 615, or both. For example, the guided capture component 620 may receive information from the input module 610, send information to the output module 615, or be integrated in combination with the input module 610, the output module 615, or both to receive information, transmit information, or perform various other operations as described herein.

The user input component 625 may be configured as or otherwise support a means for receiving, from a client device, a user input indicating a product that is to be listed for sale via an online marketplace. The instruction transmitting component 630 may be configured as or otherwise support a means for transmitting, to the client device based on the user input, an instruction for the client device to capture a video of the product from a set of multiple perspectives that includes a reference perspective. The video receiving component 635 may be configured as or otherwise support a means for receiving the video of the product from the client device based on the instruction, the video including a set of multiple image frames depicting the product from the set of multiple perspectives. The image frame extraction component 640 may be configured as or otherwise support a means for extracting a subset of image frames of the set of multiple image frames that depict the product from a set of multiple cardinal views, the set of multiple cardinal views determined relative to the reference perspective. The item listing component 645 may be configured as or otherwise support a means for generating an item listing for listing the product for sale via the online marketplace, where the item listing includes the subset of image frames.

The user input component 625 may be configured as or otherwise support a means for receiving, from a client device, a user input indicating a product that is to be listed for sale via an online marketplace. The user input component 625 may be configured as or otherwise support a means for transmitting, to the client device based on the user input, an instruction for the client device to capture a video of the product from a set of multiple perspectives that includes a reference perspective. The user input component 625 may be configured as or otherwise support a means for receiving the video of the product from the client device based on the instruction, the video including a set of multiple image frames depicting the product from the set of multiple perspectives. The user input component 625 may be configured as or otherwise support a means for extracting a subset of image frames of the set of multiple image frames that depict the product from a set of multiple cardinal views, the set of multiple cardinal views determined relative to the reference perspective. The user input component 625 may be configured as or otherwise support a means for generating an item listing for listing the product for sale via the online marketplace, where the item listing includes the subset of image frames.

Figure 7:
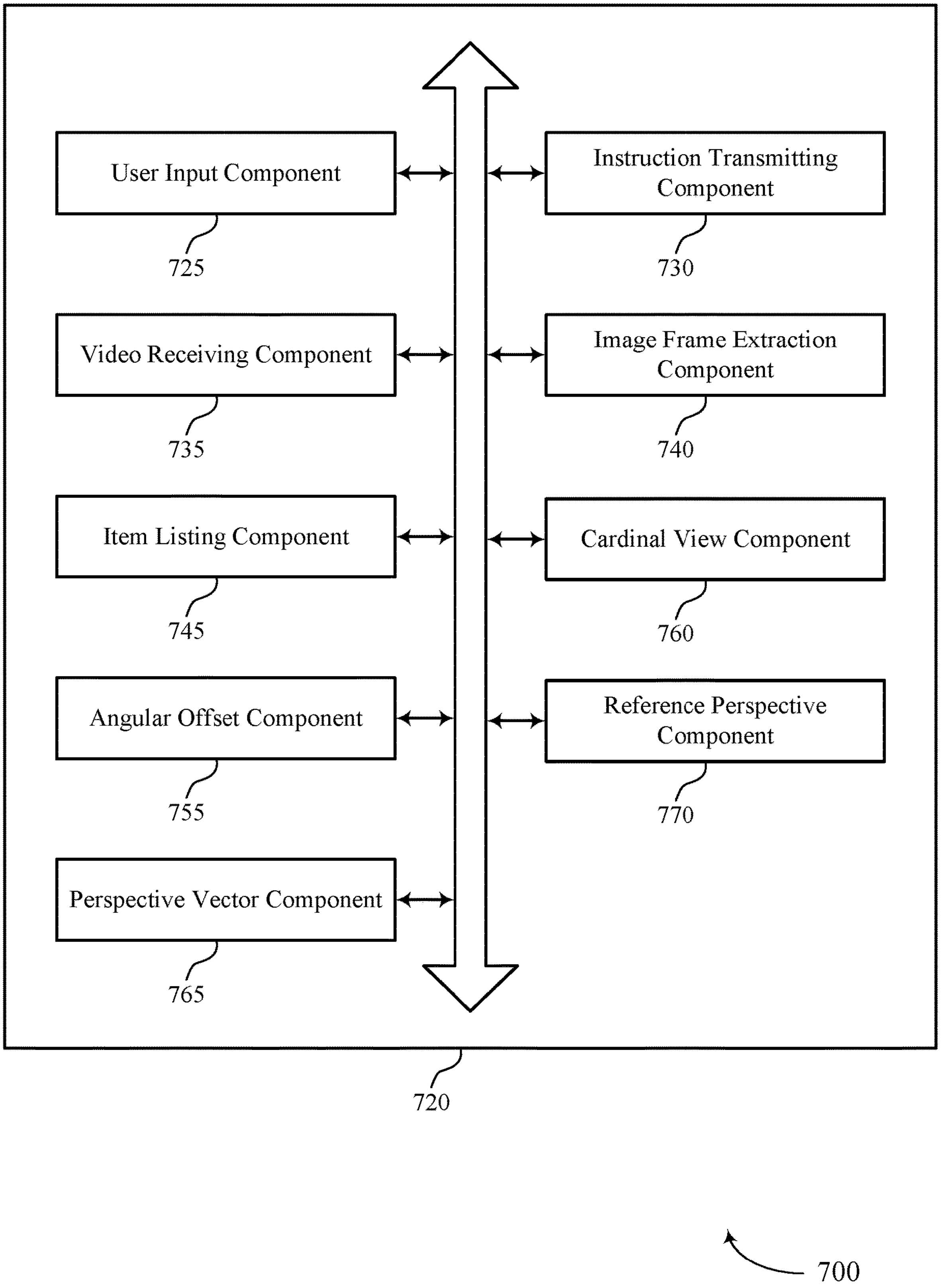
FIG. 7 shows a block diagram of a guided capture component that supports guided capture methodologies in accordance with aspects of the present disclosure.

FIG. 7 shows a block diagram 700 of a guided capture component 720 that supports guided capture methodologies in accordance with aspects of the present disclosure. The guided capture component 720 may be an example of aspects of a guided capture component or a guided capture component 620, or both, as described herein. The guided capture component 720, or various components thereof, may be an example of means for performing various aspects of guided capture methodologies as described herein. For example, the guided capture component 720 may include a user input component 725, an instruction transmitting component 730, a video receiving component 735, an image frame extraction component 740, an item listing component 745, an angular offset component 755, a cardinal view component 760, a perspective vector component 765, a reference perspective component 770, or any combination thereof. Each of these components may communicate, directly or indirectly, with one another (e.g., via one or more buses).

The user input component 725 may be configured as or otherwise support a means for receiving, from a client device, a user input indicating a product that is to be listed for sale via an online marketplace. The instruction transmitting component 730 may be configured as or otherwise support a means for transmitting, to the client device based on the user input, an instruction for the client device to capture a video of the product from a set of multiple perspectives that includes a reference perspective. The video receiving component 735 may be configured as or otherwise support a means for receiving the video of the product from the client device based on the instruction, the video including a set of multiple image frames depicting the product from the set of multiple perspectives. The image frame extraction component 740 may be configured as or otherwise support a means for extracting a subset of image frames of the set of multiple image frames that depict the product from a set of multiple cardinal views, the set of multiple cardinal views determined relative to the reference perspective. The item listing component 745 may be configured as or otherwise support a means for generating an item listing for listing the product for sale via the online marketplace, where the item listing includes the subset of image frames.

In some examples, the angular offset component 755 may be configured as or otherwise support a means for determining a first set of angular offsets between the reference perspective and the set of multiple cardinal views. In some examples, the angular offset component 755 may be configured as or otherwise support a means for determining a second set of angular offsets between the reference perspective and the set of multiple perspectives associated with the set of multiple image frames. In some examples, the cardinal view component 760 may be configured as or otherwise support a means for determining that the subset of image frames depict the product from the set of multiple cardinal views based on a comparison between the first set of angular offsets and the second set of angular offsets.

In some examples, to support determining the reference perspective, the instruction transmitting component 730 may be configured as or otherwise support a means for transmitting, via the instruction, for the client device to start the video from the reference perspective, where the reference perspective includes an image frame from a first set of image frames of the video. In some examples, to support determining the reference perspective, the reference perspective component 770 may be configured as or otherwise support a means for selecting a reference image frame from the set of multiple image frames, where the reference perspective is associated with the reference image frame.

In some examples, the perspective vector component 765 may be configured as or otherwise support a means for calculating a set of multiple perspective vectors associated with the set of multiple image frames, where each perspective vector includes a vector between the product depicted in the respective image frame and the client device at a time when the respective image frame was captured. In some examples, the cardinal view component 760 may be configured as or otherwise support a means for determining whether each image frame of the set of multiple image frames depicts the product from a cardinal view of the set of multiple cardinal views based on the respective perspective vector corresponding to the respective image frame, where extracting the subset of image frames is based on the determination.

In some examples, the set of multiple perspective vectors are calculated based on spatial location data received from the client device, a simultaneous localization and mapping operation performed on the set of multiple image frames, or both.

In some examples, the user input component 725 may be configured as or otherwise support a means for receiving, via the user input, a product type associated with the product, a category associated with the product, or both. In some examples, the cardinal view component 760 may be configured as or otherwise support a means for determining the set of multiple cardinal views associated with the product based on the product type, the category, or both, where extracting the subset of image frames is based on determining the set of multiple cardinal views.

In some examples, the image frame extraction component 740 may be configured as or otherwise support a means for extracting the subset of image frames of the set of multiple image frames based on the subset of image frames satisfying one or more image quality criterion, where the one or more image quality criterion include a lighting criteria, a focus criteria, an object position criteria, or any combination thereof.

In some examples, the instruction includes directions for a user to capture the video while moving around the product, while rotating the product, or both.

In some examples, each cardinal view of the set of multiple cardinal views includes a range of viewing angles depicting the product. In some examples, the subset of image frames are extracted based on the subset of image frames depicting the product from a viewing angle within the range of viewing angles associated with at least one cardinal view of the set of multiple cardinal views.

In some examples, the 750 may be configured as or otherwise support a means for determining a first set of angular offsets between the reference perspective and the set of multiple cardinal views. In some examples, the 750 may be configured as or otherwise support a means for determining a second set of angular offsets between the reference perspective and the set of multiple perspectives associated with the set of multiple image frames. In some examples, the 750 may be configured as or otherwise support a means for determining that the subset of image frames depict the product from the set of multiple cardinal views based on a comparison between the first set of angular offsets and the second set of angular offsets.

Figure 8:
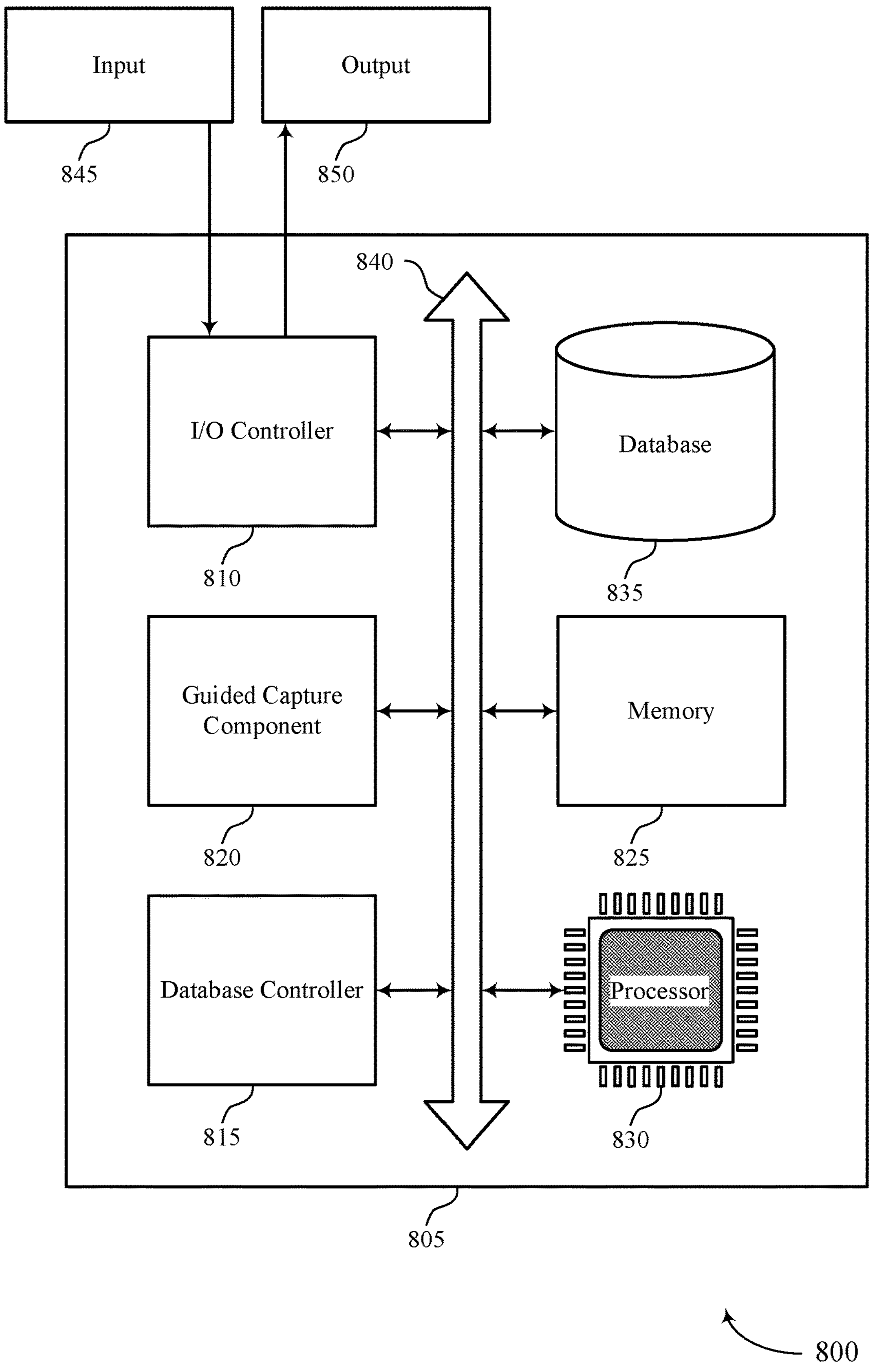
FIG. 8 shows a diagram of a system including a device that supports guided capture methodologies in accordance with aspects of the present disclosure.

FIG. 8 shows a diagram of a system 800 including a device 805 that supports guided capture methodologies in accordance with aspects of the present disclosure. The device 805 may be an example of or include the components of a device 605 as described herein. The device 805 may include components for bi-directional data communications including components for transmitting and receiving communications, such as a guided capture component 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting guided capture methodologies).

For example, the guided capture component 820 may be configured as or otherwise support a means for receiving, from a client device, a user input indicating a product that is to be listed for sale via an online marketplace. The guided capture component 820 may be configured as or otherwise support a means for transmitting, to the client device based on the user input, an instruction for the client device to capture a video of the product from a set of multiple perspectives that includes a reference perspective. The guided capture component 820 may be configured as or otherwise support a means for receiving the video of the product from the client device based on the instruction, the video including a set of multiple image frames depicting the product from the set of multiple perspectives. The guided capture component 820 may be configured as or otherwise support a means for extracting a subset of image frames of the set of multiple image frames that depict the product from a set of multiple cardinal views, the set of multiple cardinal views determined relative to the reference perspective. The guided capture component 820 may be configured as or otherwise support a means for generating an item listing for listing the product for sale via the online marketplace, where the item listing includes the subset of image frames.

For example, the guided capture component 820 may be configured as or otherwise support a means for receiving, from a client device, a user input indicating a product that is to be listed for sale via an online marketplace. The guided capture component 820 may be configured as or otherwise support a means for transmitting, to the client device based on the user input, an instruction for the client device to capture a video of the product from a set of multiple perspectives that includes a reference perspective. The guided capture component 820 may be configured as or otherwise support a means for receiving the video of the product from the client device based on the instruction, the video including a set of multiple image frames depicting the product from the set of multiple perspectives. The guided capture component 820 may be configured as or otherwise support a means for extracting a subset of image frames of the set of multiple image frames that depict the product from a set of multiple cardinal views, the set of multiple cardinal views determined relative to the reference perspective. The guided capture component 820 may be configured as or otherwise support a means for generating an item listing for listing the product for sale via the online marketplace, where the item listing includes the subset of image frames.

Figure 9:
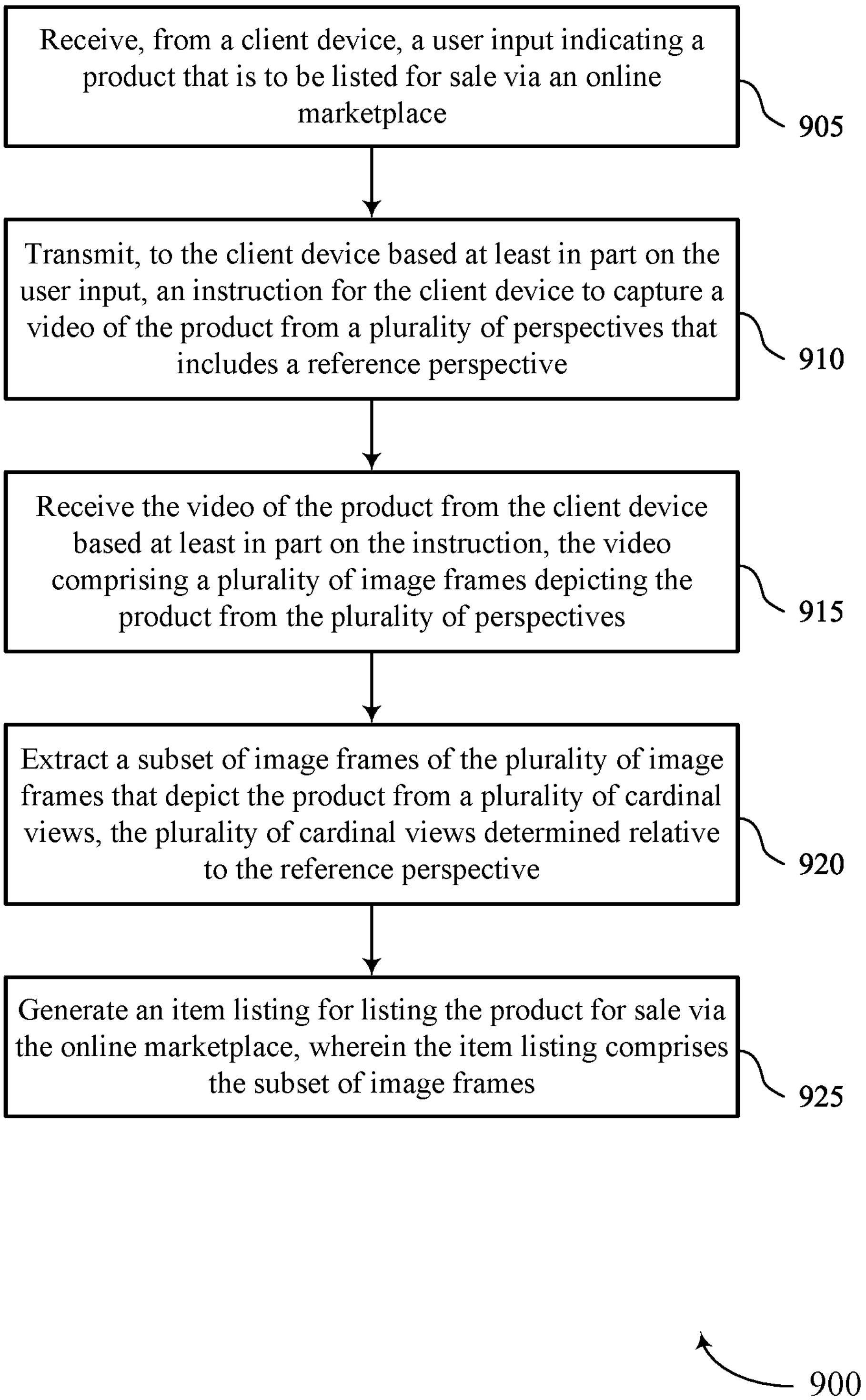
FIGS. 9 through 11 show flowcharts illustrating methods that support guided capture methodologies in accordance with aspects of the present disclosure.

FIG. 9 shows a flowchart illustrating a method 900 that supports guided capture methodologies in accordance with aspects of the present disclosure. The operations of the method 900 may be implemented by respective devices described herein, such as a client device, a server, or any combination thereof.

At 905, the method may include receiving, from a client device, a user input indicating a product that is to be listed for sale via an online marketplace. The operations of 905 may be performed in accordance with examples as disclosed herein. In some examples, aspects of the operations of 905 may be performed by a user input component 725 as described with reference to FIG. 7.

At 910, the method may include transmitting, to the client device based on the user input, an instruction for the client device to capture a video of the product from a set of multiple perspectives that includes a reference perspective. The operations of 910 may be performed in accordance with examples as disclosed herein. In some examples, aspects of the operations of 910 may be performed by an instruction transmitting component 730 as described with reference to FIG. 7.

At 915, the method may include receiving the video of the product from the client device based on the instruction, the video including a set of multiple image frames depicting the product from the set of multiple perspectives. The operations of 915 may be performed in accordance with examples as disclosed herein. In some examples, aspects of the operations of 915 may be performed by a video receiving component 735 as described with reference to FIG. 7.

At 920, the method may include extracting a subset of image frames of the set of multiple image frames that depict the product from a set of multiple cardinal views, the set of multiple cardinal views determined relative to the reference perspective. The operations of 920 may be performed in accordance with examples as disclosed herein. In some examples, aspects of the operations of 920 may be performed by an image frame extraction component 740 as described with reference to FIG. 7.

At 925, the method may include generating an item listing for listing the product for sale via the online marketplace, where the item listing includes the subset of image frames. The operations of 925 may be performed in accordance with examples as disclosed herein. In some examples, aspects of the operations of 925 may be performed by an item listing component 745 as described with reference to FIG. 7.

Figure 10:
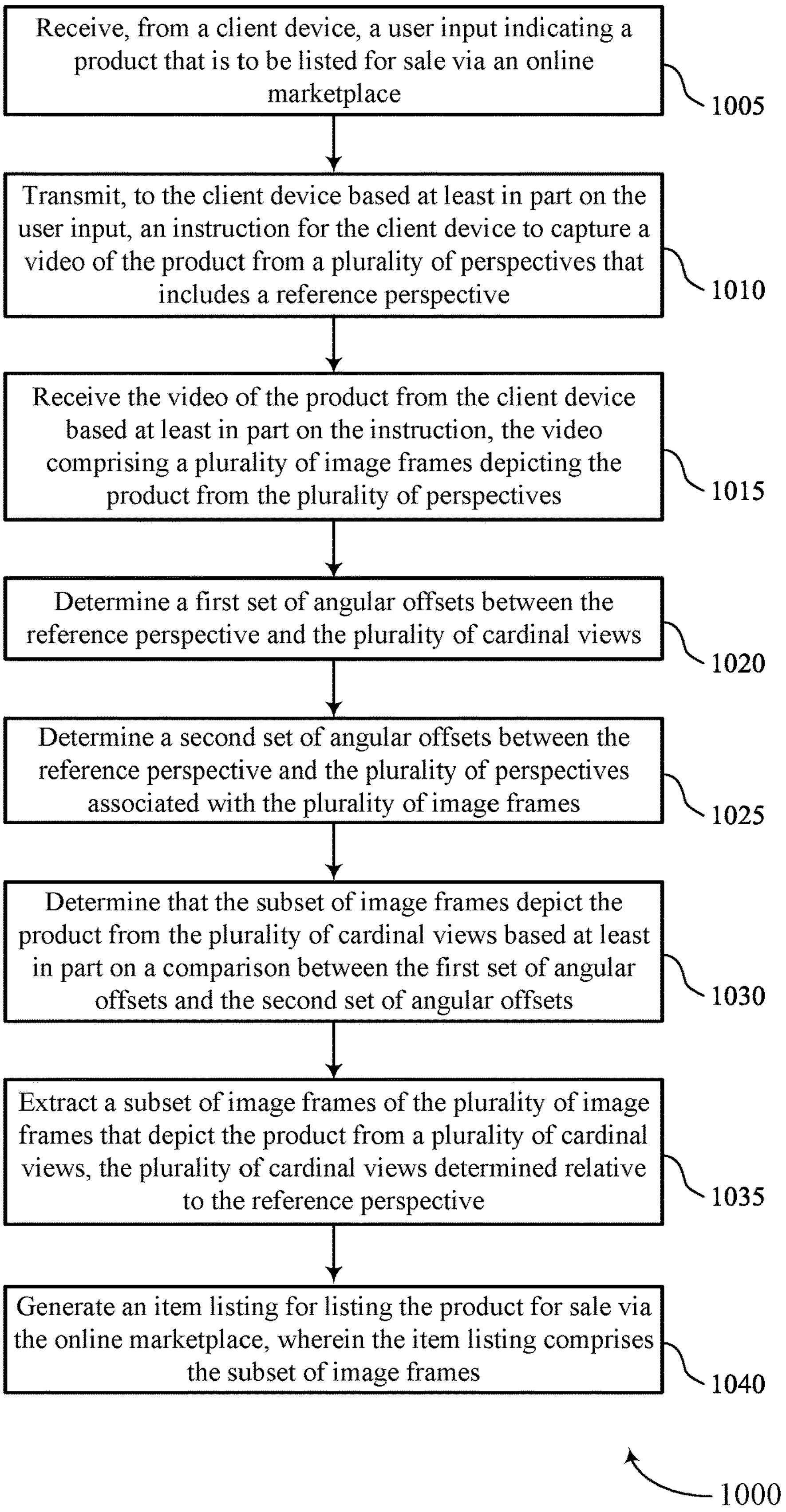

FIG. 10 shows a flowchart illustrating a method 1000 that supports guided capture methodologies in accordance with aspects of the present disclosure. The operations of the method 1000 may be implemented by respective devices described herein, such as a client device, a server, or any combination thereof.

At 1005, the method may include receiving, from a client device, a user input indicating a product that is to be listed for sale via an online marketplace. The operations of 1005 may be performed in accordance with examples as disclosed herein. In some examples, aspects of the operations of 1005 may be performed by a user input component 725 as described with reference to FIG. 7.

At 1010, the method may include transmitting, to the client device based on the user input, an instruction for the client device to capture a video of the product from a set of multiple perspectives that includes a reference perspective. The operations of 1010 may be performed in accordance with examples as disclosed herein. In some examples, aspects of the operations of 1010 may be performed by an instruction transmitting component 730 as described with reference to FIG. 7.

At 1015, the method may include receiving the video of the product from the client device based on the instruction, the video including a set of multiple image frames depicting the product from the set of multiple perspectives. The operations of 1015 may be performed in accordance with examples as disclosed herein. In some examples, aspects of the operations of 1015 may be performed by a video receiving component 735 as described with reference to FIG. 7.

At 1020, the method may include determining a first set of angular offsets between the reference perspective and the set of multiple cardinal views. The operations of 1020 may be performed in accordance with examples as disclosed herein. In some examples, aspects of the operations of 1020 may be performed by an angular offset component 755 as described with reference to FIG. 7.

At 1025, the method may include determining a second set of angular offsets between the reference perspective and the set of multiple perspectives associated with the set of multiple image frames. The operations of 1025 may be performed in accordance with examples as disclosed herein. In some examples, aspects of the operations of 1025 may be performed by an angular offset component 755 as described with reference to FIG. 7.

At 1030, the method may include determining that the subset of image frames depict the product from the set of multiple cardinal views based on a comparison between the first set of angular offsets and the second set of angular offsets. The operations of 1030 may be performed in accordance with examples as disclosed herein. In some examples, aspects of the operations of 1030 may be performed by a cardinal view component 760 as described with reference to FIG. 7.

At 1035, the method may include extracting a subset of image frames of the set of multiple image frames that depict the product from a set of multiple cardinal views, the set of multiple cardinal views determined relative to the reference perspective. The operations of 1035 may be performed in accordance with examples as disclosed herein. In some examples, aspects of the operations of 1035 may be performed by an image frame extraction component 740 as described with reference to FIG. 7.

At 1040, the method may include generating an item listing for listing the product for sale via the online marketplace, where the item listing includes the subset of image frames. The operations of 1040 may be performed in accordance with examples as disclosed herein. In some examples, aspects of the operations of 1040 may be performed by an item listing component 745 as described with reference to FIG. 7.

Figure 11:
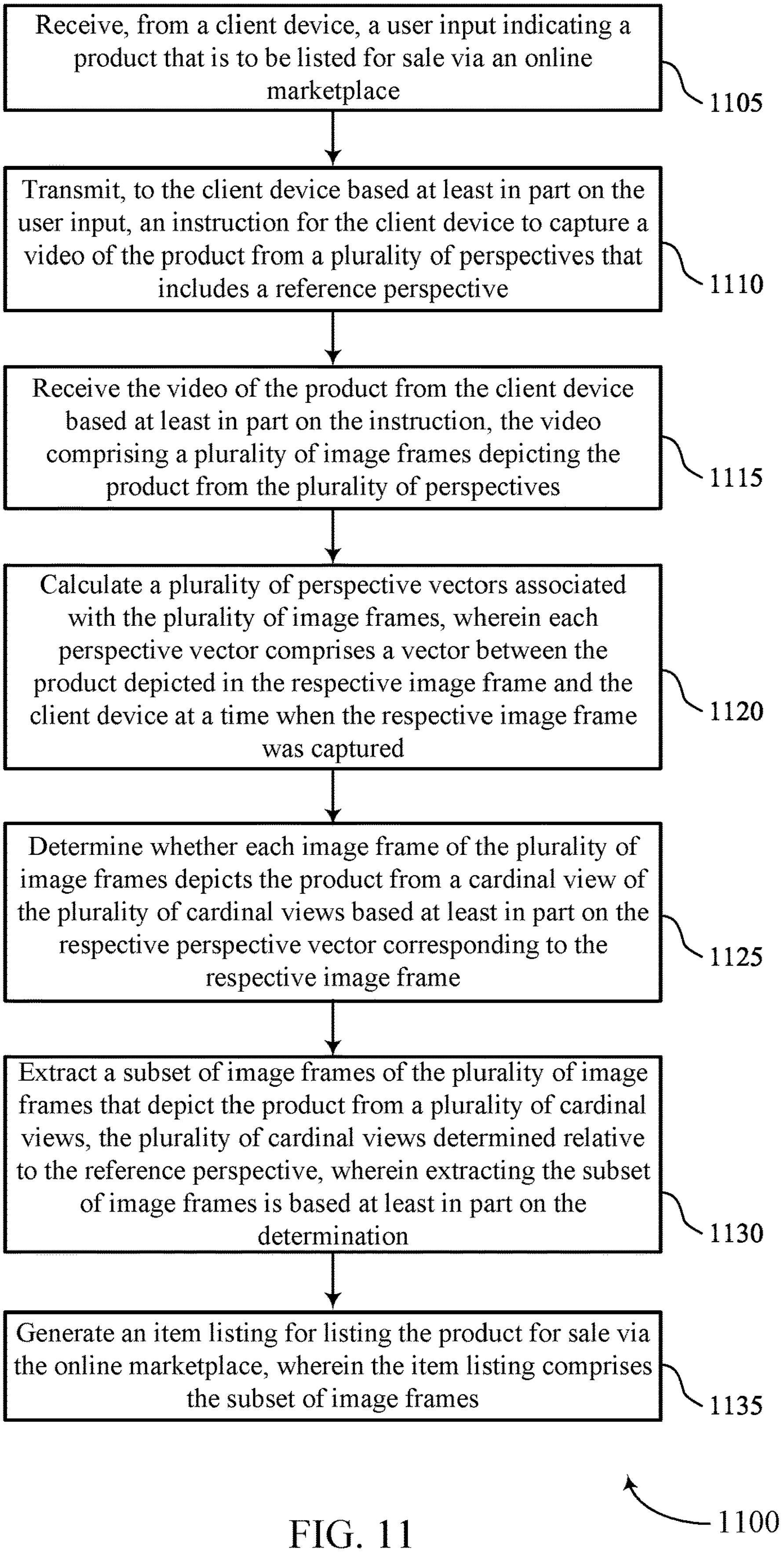

FIG. 11 shows a flowchart illustrating a method 1100 that supports guided capture methodologies in accordance with aspects of the present disclosure. The operations of the method 1100 may be implemented by respective devices described herein, such as a client device, a server, or any combination thereof.

At 1105, the method may include receiving, from a client device, a user input indicating a product that is to be listed for sale via an online marketplace. The operations of 1105 may be performed in accordance with examples as disclosed herein. In some examples, aspects of the operations of 1105 may be performed by a user input component 725 as described with reference to FIG. 7.

At 1110, the method may include transmitting, to the client device based on the user input, an instruction for the client device to capture a video of the product from a set of multiple perspectives that includes a reference perspective. The operations of 1110 may be performed in accordance with examples as disclosed herein. In some examples, aspects of the operations of 1110 may be performed by an instruction transmitting component 730 as described with reference to FIG. 7.

At 1115, the method may include receiving the video of the product from the client device based on the instruction, the video including a set of multiple image frames depicting the product from the set of multiple perspectives. The operations of 1115 may be performed in accordance with examples as disclosed herein. In some examples, aspects of the operations of 1115 may be performed by a video receiving component 735 as described with reference to FIG. 7.

At 1120, the method may include calculating a set of multiple perspective vectors associated with the set of multiple image frames, where each perspective vector includes a vector between the product depicted in the respective image frame and the client device at a time when the respective image frame was captured. The operations of 1120 may be performed in accordance with examples as disclosed herein. In some examples, aspects of the operations of 1120 may be performed by a perspective vector component 765 as described with reference to FIG. 7.

At 1125, the method may include determining whether each image frame of the set of multiple image frames depicts the product from a cardinal view of the set of multiple cardinal views based on the respective perspective vector corresponding to the respective image frame. The operations of 1125 may be performed in accordance with examples as disclosed herein. In some examples, aspects of the operations of 1125 may be performed by a cardinal view component 760 as described with reference to FIG. 7.

At 1130, the method may include extracting a subset of image frames of the set of multiple image frames that depict the product from a set of multiple cardinal views, the set of multiple cardinal views determined relative to the reference perspective, where extracting the subset of image frames is based on the determination. The operations of 1130 may be performed in accordance with examples as disclosed herein. In some examples, aspects of the operations of 1130 may be performed by an image frame extraction component 740 as described with reference to FIG. 7.

At 1135, the method may include generating an item listing for listing the product for sale via the online marketplace, where the item listing includes the subset of image frames. The operations of 1135 may be performed in accordance with examples as disclosed herein. In some examples, aspects of the operations of 1135 may be performed by an item listing component 745 as described with reference to FIG. 7.

A method is described. The method may include receiving, from a client device, a user input indicating a product that is to be listed for sale via an online marketplace, transmitting, to the client device based on the user input, an instruction for the client device to capture a video of the product from a set of multiple perspectives that includes a reference perspective, receiving the video of the product from the client device based on the instruction, the video including a set of multiple image frames depicting the product from the set of multiple perspectives, extracting a subset of image frames of the set of multiple image frames that depict the product from a set of multiple cardinal views, the set of multiple cardinal views determined relative to the reference perspective, and generating an item listing for listing the product for sale via the online marketplace, where the item listing includes the subset of image frames.

An apparatus is described. The apparatus may include a processor, memory coupled with the processor, and instructions stored in the memory. The instructions may be executable by the processor to cause the apparatus to receive, from a client device, a user input indicating a product that is to be listed for sale via an online marketplace, transmit, to the client device based on the user input, an instruction for the client device to capture a video of the product from a set of multiple perspectives that includes a reference perspective, receive the video of the product from the client device based on the instruction, the video including a set of multiple image frames depicting the product from the set of multiple perspectives, extract a subset of image frames of the set of multiple image frames that depict the product from a set of multiple cardinal views, the set of multiple cardinal views determined relative to the reference perspective, and generate an item listing for listing the product for sale via the online marketplace, where the item listing includes the subset of image frames.

Another apparatus is described. The apparatus may include means for receiving, from a client device, a user input indicating a product that is to be listed for sale via an online marketplace, means for transmitting, to the client device based on the user input, an instruction for the client device to capture a video of the product from a set of multiple perspectives that includes a reference perspective, means for receiving the video of the product from the client device based on the instruction, the video including a set of multiple image frames depicting the product from the set of multiple perspectives, means for extracting a subset of image frames of the set of multiple image frames that depict the product from a set of multiple cardinal views, the set of multiple cardinal views determined relative to the reference perspective, and means for generating an item listing for listing the product for sale via the online marketplace, where the item listing includes the subset of image frames.

A non-transitory computer-readable medium storing code is described. The code may include instructions executable by a processor to receive, from a client device, a user input indicating a product that is to be listed for sale via an online marketplace, transmit, to the client device based on the user input, an instruction for the client device to capture a video of the product from a set of multiple perspectives that includes a reference perspective, receive the video of the product from the client device based on the instruction, the video including a set of multiple image frames depicting the product from the set of multiple perspectives, extract a subset of image frames of the set of multiple image frames that depict the product from a set of multiple cardinal views, the set of multiple cardinal views determined relative to the reference perspective, and generate an item listing for listing the product for sale via the online marketplace, where the item listing includes the subset of image frames.

Some examples of the method, apparatuses, and non-transitory computer-readable medium described herein may further include operations, features, means, or instructions for determining a first set of angular offsets between the reference perspective and the set of multiple cardinal views, determining a second set of angular offsets between the reference perspective and the set of multiple perspectives associated with the set of multiple image frames, and determining that the subset of image frames depict the product from the set of multiple cardinal views based on a comparison between the first set of angular offsets and the second set of angular offsets.

In some examples of the method, apparatuses, and non-transitory computer-readable medium described herein, determining the reference perspective may include operations, features, means, or instructions for transmitting, via the instruction, for the client device to start the video from the reference perspective, where the reference perspective includes an image frame from a first set of image frames of the video and selecting a reference image frame from the set of multiple image frames, where the reference perspective may be associated with the reference image frame.

Some examples of the method, apparatuses, and non-transitory computer-readable medium described herein may further include operations, features, means, or instructions for calculating a set of multiple perspective vectors associated with the set of multiple image frames, where each perspective vector includes a vector between the product depicted in the respective image frame and the client device at a time when the respective image frame was captured and determining whether each image frame of the set of multiple image frames depicts the product from a cardinal view of the set of multiple cardinal views based on the respective perspective vector corresponding to the respective image frame, where extracting the subset of image frames may be based on the determination.

In some examples of the method, apparatuses, and non-transitory computer-readable medium described herein, the set of multiple perspective vectors may be calculated based on spatial location data received from the client device, a simultaneous localization and mapping operation performed on the set of multiple image frames, or both.

Some examples of the method, apparatuses, and non-transitory computer-readable medium described herein may further include operations, features, means, or instructions for receiving, via the user input, a product type associated with the product, a category associated with the product, or both and determining the set of multiple cardinal views associated with the product based on the product type, the category, or both, where extracting the subset of image frames may be based on determining the set of multiple cardinal views.

Some examples of the method, apparatuses, and non-transitory computer-readable medium described herein may further include operations, features, means, or instructions for extracting the subset of image frames of the set of multiple image frames based on the subset of image frames satisfying one or more image quality criterion, where the one or more image quality criterion include a lighting criteria, a focus criteria, an object position criteria, or any combination thereof.

In some examples of the method, apparatuses, and non-transitory computer-readable medium described herein, the instruction includes directions for a user to capture the video while moving around the product, while rotating the product, or both.

In some examples of the method, apparatuses, and non-transitory computer-readable medium described herein, each cardinal view of the set of multiple cardinal views includes a range of viewing angles depicting the product and the subset of image frames may be extracted based on the subset of image frames depicting the product from a viewing angle within the range of viewing angles associated with at least one cardinal view of the set of multiple cardinal views.

A method is described. The method may include receiving, from a client device, a user input indicating a product that is to be listed for sale via an online marketplace, transmitting, to the client device based on the user input, an instruction for the client device to capture a video of the product from a set of multiple perspectives that includes a reference perspective, receiving the video of the product from the client device based on the instruction, the video including a set of multiple image frames depicting the product from the set of multiple perspectives, extracting a subset of image frames of the set of multiple image frames that depict the product from a set of multiple cardinal views, the set of multiple cardinal views determined relative to the reference perspective, and generating an item listing for listing the product for sale via the online marketplace, where the item listing includes the subset of image frames.

An apparatus is described. The apparatus may include a processor, memory coupled with the processor, and instructions stored in the memory. The instructions may be executable by the processor to cause the apparatus to receive, from a client device, a user input indicating a product that is to be listed for sale via an online marketplace, transmit, to the client device based on the user input, an instruction for the client device to capture a video of the product from a set of multiple perspectives that includes a reference perspective, receive the video of the product from the client device based on the instruction, the video including a set of multiple image frames depicting the product from the set of multiple perspectives, extract a subset of image frames of the set of multiple image frames that depict the product from a set of multiple cardinal views, the set of multiple cardinal views determined relative to the reference perspective, and generate an item listing for listing the product for sale via the online marketplace, where the item listing includes the subset of image frames.

Another apparatus is described. The apparatus may include means for receiving, from a client device, a user input indicating a product that is to be listed for sale via an online marketplace, means for transmitting, to the client device based on the user input, an instruction for the client device to capture a video of the product from a set of multiple perspectives that includes a reference perspective, means for receiving the video of the product from the client device based on the instruction, the video including a set of multiple image frames depicting the product from the set of multiple perspectives, means for extracting a subset of image frames of the set of multiple image frames that depict the product from a set of multiple cardinal views, the set of multiple cardinal views determined relative to the reference perspective, and means for generating an item listing for listing the product for sale via the online marketplace, where the item listing includes the subset of image frames.

A non-transitory computer-readable medium storing code is described. The code may include instructions executable by a processor to receive, from a client device, a user input indicating a product that is to be listed for sale via an online marketplace, transmit, to the client device based on the user input, an instruction for the client device to capture a video of the product from a set of multiple perspectives that includes a reference perspective, receive the video of the product from the client device based on the instruction, the video including a set of multiple image frames depicting the product from the set of multiple perspectives, extract a subset of image frames of the set of multiple image frames that depict the product from a set of multiple cardinal views, the set of multiple cardinal views determined relative to the reference perspective, and generate an item listing for listing the product for sale via the online marketplace, where the item listing includes the subset of image frames.

Some examples of the method, apparatuses, and non-transitory computer-readable medium described herein may further include operations, features, means, or instructions for determining a first set of angular offsets between the reference perspective and the set of multiple cardinal views, determine a second set of angular offsets between the reference perspective and the set of multiple perspectives associated with the set of multiple image frames, and determine that the subset of image frames depict the product from the set of multiple cardinal views based on a comparison between the first set of angular offsets and the second set of angular offsets.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method, comprising:

receiving, from a client device, a user input indicating a product that is to be listed for sale via an online marketplace;

transmitting, to the client device based on the user input, an instruction for the client device to capture a video of the product in an environment from a plurality of perspectives that includes a reference perspective and a plurality of angles using a camera, wherein settings of the camera of the client device are automatically adjusted in real-time as the client device captures the video;

receiving the video of the product from the client device based on the instruction, the video comprising a plurality of image frames depicting the product in the environment from the plurality of perspectives and the plurality of angles, and the plurality of image frames having image quality metrics based on the adjusted settings;

extracting, for each cardinal view of a plurality of cardinal views, a subset of two or more image frames from the plurality of image frames taken of the product within the respective cardinal view, the plurality of cardinal views determined relative to the reference perspective;

performing a background removal operation on the subset of two or more image frames extracted for each cardinal view, wherein the background removal operation comprises modifying one or more characteristics of the subset of two or more image frames to remove a background such that the subset of two or more image frames depict the product without the environment; and generating an item listing for listing the product for sale via the online marketplace based on the subset of two or more image frames extracted for each cardinal view, wherein the subset of two or more image frames are included in the item listing based on the image quality metrics and the background removal operation.

2. The computer-implemented method of claim 1, further comprising:

determining a first set of angular offsets between the reference perspective and the plurality of cardinal views;

determining a second set of angular offsets between the reference perspective and the plurality of perspectives associated with the plurality of image frames; and determining that the subset of two or more image frames extracted for each cardinal view depict the product from within a respective cardinal view of the plurality of cardinal views based on a comparison between the first set of angular offsets and the second set of angular offsets.

3. The computer-implemented method of claim 2, wherein determining the reference perspective comprises:

transmitting, via the instruction, for the client device to start the video from the reference perspective, wherein the reference perspective comprises an image frame from a first set of image frames of the video; or selecting a reference image frame from the plurality of image frames, wherein the reference perspective is associated with the reference image frame.

4. The computer-implemented method of claim 1, further comprising:

calculating a plurality of perspective vectors associated with the plurality of image frames, wherein each perspective vector comprises a vector between the product depicted in a respective image frame of the plurality of image frames and the client device at a time when the respective image frame is captured, and each perspective vector calculated based on relative positions of the client device and the product determined by using sensors of the client device while the plurality of image frames are taken; and determining whether each image frame of the plurality of image frames depicts the product from a cardinal view of the plurality of cardinal views based on a perspective vector corresponding to the respective image frame, wherein extracting the subset of two or more image frames is based on the determining.

5. The computer-implemented method of claim 4, wherein the plurality of perspective vectors are calculated based on at least one of spatial location data received from the client device or a simultaneous localization and mapping operation performed on the plurality of image frames.

6. The computer-implemented method of claim 1, further comprising:

receiving, via the user input, at least one of a product type associated with the product or a category associated with the product; and determining the plurality of cardinal views associated with the product based on at least one of the product type or the category, wherein extracting the subset of two or more image frames is based on determining the plurality of cardinal views.

7. The computer-implemented method of claim 1, further comprising extracting the subset of two or more image frames for each cardinal view based on the subset of two or more image frames satisfying one or more image quality criterion, wherein the one or more image quality criterion comprise at least one of a lighting criteria, a focus criteria, or an object position criteria.

8. The computer-implemented method of claim 1, wherein the instruction comprises directions for a user to capture the video while at least one of moving around the product or rotating the product.

9. The computer-implemented method of claim 1, wherein each cardinal view of the plurality of cardinal views comprises a range of viewing angles of the product, and wherein the subset of two or more image frames extracted for each cardinal view is extracted based on depicting the product from a viewing angle within the range of viewing angles associated with a respective cardinal view.

10. An apparatus, comprising:

a processor;

memory coupled with the processor; and instructions stored in the memory and executable by the processor to cause the apparatus to:

receive, from a client device, a user input indicating a product that is to be listed for sale via an online marketplace;

transmit, to the client device based on the user input, an instruction for the client device to capture a video of the product in an environment from a plurality of perspectives that includes a reference perspective and a plurality of angles using a camera, wherein settings of the camera of the client device are automatically adjusted in real-time as the client device captures the video;

receive the video of the product from the client device based on the instruction, the video comprising a plurality of image frames depicting the product in the environment from the plurality of perspectives and the plurality of angles, and the plurality of image frames having image quality metrics based on the adjusted settings;

extract, for each cardinal view of a plurality of cardinal views, a subset of two or more image frames from the plurality of image frames taken of the product within the respective cardinal view, the plurality of cardinal views determined relative to the reference perspective;

perform a background removal operation on the subset of two or more image frames extracted for each cardinal view, wherein the background removal operation comprises modifying one or more characteristics of the subset of two or more image frames to remove a background such that the subset of two or more image frames depict the product without the environment; and generate an item listing for listing the product for sale via the online marketplace based on the subset of two or more image frames extracted for each cardinal view, wherein the subset of two or more image frames are included in the item listing based on the image quality metrics and the background removal operation.

11. The apparatus of claim 10, wherein the instructions are further executable by the processor to cause the apparatus to:

determine a first set of angular offsets between the reference perspective and the plurality of cardinal views;

determine a second set of angular offsets between the reference perspective and the plurality of perspectives associated with the plurality of image frames; and determine that the subset of two or more image frames extracted for each cardinal view depict the product from within a respective cardinal view of the plurality of cardinal views based on a comparison between the first set of angular offsets and the second set of angular offsets.

12. The apparatus of claim 11, wherein the instructions to determine the reference perspective are executable by the processor to cause the apparatus to:

transmit, via the instruction, for the client device to start the video from the reference perspective, wherein the reference perspective comprises an image frame from a first set of image frames of the video; or select a reference image frame from the plurality of image frames, wherein the reference perspective is associated with the reference image frame.

13. The apparatus of claim 10, wherein the instructions are further executable by the processor to cause the apparatus to:

calculate a plurality of perspective vectors associated with the plurality of image frames, wherein each perspective vector comprises a vector between the product depicted in a respective image frame of the plurality of image frames and the client device at a time when the respective image frame is captured; and determine whether each image frame of the plurality of image frames depicts the product from a cardinal view of the plurality of cardinal views based on a perspective vector corresponding to the respective image frame, wherein extracting the subset of two or more image frames is based on the determination.

14. The apparatus of claim 13, wherein the plurality of perspective vectors are calculated based on at least one of spatial location data received from the client device or a simultaneous localization and mapping operation performed on the plurality of image frames.

15. The apparatus of claim 10, wherein the instructions are further executable by the processor to cause the apparatus to:

receive, via the user input, at least one of a product type associated with the product or a category associated with the product; and determine the plurality of cardinal views associated with the product based on at least one of the product type or the category, wherein extracting the subset of two or more image frames is based on determining the plurality of cardinal views.

16. The apparatus of claim 10, wherein the instructions are further executable by the processor to cause the apparatus to extract the subset of two or more image frames for each cardinal view based on the subset of two or more image frames satisfying one or more image quality criterion, wherein the one or more image quality criterion comprise at least one of a lighting criteria, a focus criteria, or an object position criteria.

17. The apparatus of claim 10, wherein the instruction comprises directions for a user to capture the video while at least one of moving around the product or rotating the product.

18. The apparatus of claim 10, wherein each cardinal view of the plurality of cardinal views comprises a range of viewing angles of the product, and wherein the subset of two or more image frames extracted for each cardinal view is extracted based on depicting the product from a viewing angle within the range of viewing angles associated with a respective cardinal view.

19. A non-transitory computer-readable medium storing code comprising instructions executable by a processor to:

receive, from a client device, a user input indicating a product that is to be listed for sale via an online marketplace;

transmit, to the client device based on the user input, an instruction for the client device to capture a video of the product in an environment from a plurality of perspectives that includes a reference perspective and a plurality of angles using a camera, wherein settings of the camera of the client device are automatically adjusted in real-time as the client device captures the video;

receive the video of the product from the client device based on the instruction, the video comprising a plurality of image frames depicting the product in the environment from the plurality of perspectives and the plurality of angles, and the plurality of image frames having image quality metrics based on the adjusted settings;

extract, for each cardinal view of a plurality of cardinal views, a subset of two or more image frames from the plurality of image frames taken of the product within the respective cardinal view, the plurality of cardinal views determined relative to the reference perspective;

perform a background removal operation on the subset of two or more image frames extracted for each cardinal view, wherein the background removal operation comprises modifying one or more characteristics of the subset of two or more image frames to remove a background such that the subset of two or more image frames depict the product without the environment; and generate an item listing for listing the product for sale via the online marketplace based on the subset of two or more image frames extracted for each cardinal view, wherein the subset of two or more image frames are included in the item listing based on the image quality metrics and the background removal operation.

20. The non-transitory computer-readable medium of claim 19, wherein the instructions are further executable by the processor to:

determine a first set of angular offsets between the reference perspective and the plurality of cardinal views;

determine a second set of angular offsets between the reference perspective and the plurality of perspectives associated with the plurality of image frames; and determine that the subset of two or more image frames extracted for each cardinal view depict the product from within a respective cardinal view of the plurality of cardinal views based on a comparison between the first set of angular offsets and the second set of angular offsets.

* * * * *